(12) United States Patent
Dudar et al.

(10) Patent No.: US 11,935,340 B2
(45) Date of Patent: Mar. 19, 2024

(54) ON-BOARD DIAGNOSTICS MONITOR

(71) Applicant: Ford Global Technologies, LLC, Dearborn, MI (US)

(72) Inventors: Aed Dudar, Canton, MI (US); Finn Tseng, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 480 days.

(21) Appl. No.: 17/145,739

(22) Filed: Jan. 11, 2021

(65) Prior Publication Data

US 2022/0222986 A1    Jul. 14, 2022

(51) Int. Cl.
*G07C 5/08* (2006.01)
*G01C 21/34* (2006.01)
*G06N 20/00* (2019.01)
*G07C 5/00* (2006.01)

(52) U.S. Cl.
CPC ....... *G07C 5/0841* (2013.01); *G01C 21/3461* (2013.01); *G06N 20/00* (2019.01); *G07C 5/006* (2013.01); *G07C 5/008* (2013.01); *G07C 5/0808* (2013.01)

(58) Field of Classification Search
None
See application file for complete search history.

(56) References Cited

U.S. PATENT DOCUMENTS

| | | | |
|---|---|---|---|
| 10,087,891 B2 | 10/2018 | Dudar et al. | |
| 10,330,051 B2 | 6/2019 | Dudar et al. | |
| 10,486,682 B2 | 11/2019 | Jobson et al. | |
| 2010/0223984 A1* | 9/2010 | Pursifull | F02M 25/0836 73/114.39 |
| 2015/0243109 A1* | 8/2015 | Tseng | G07C 5/0808 701/29.1 |
| 2017/0107924 A1* | 4/2017 | Blythe | F02D 41/0065 |
| 2018/0179993 A1* | 6/2018 | Dudar | F02M 25/0836 |

FOREIGN PATENT DOCUMENTS

EP        1288887 A2    3/2003

* cited by examiner

*Primary Examiner* — Hongye Liang
(74) *Attorney, Agent, or Firm* — Vincent Mastrogiacomo; McCoy Russell LLP

(57) ABSTRACT

Methods and systems are provided for learning characteristics of a road segment and using the learning during a subsequent travel on the road segment to preview the road segment and schedule diagnostic routines to increase in-use monitor performance (IUMP) rates for vehicle system diagnostics. In one example, a method may include scheduling a diagnostic routine for an engine sub-system based on the learned characteristics of the road segment, and a variable adjustable based on IUMP rate.

20 Claims, 11 Drawing Sheets

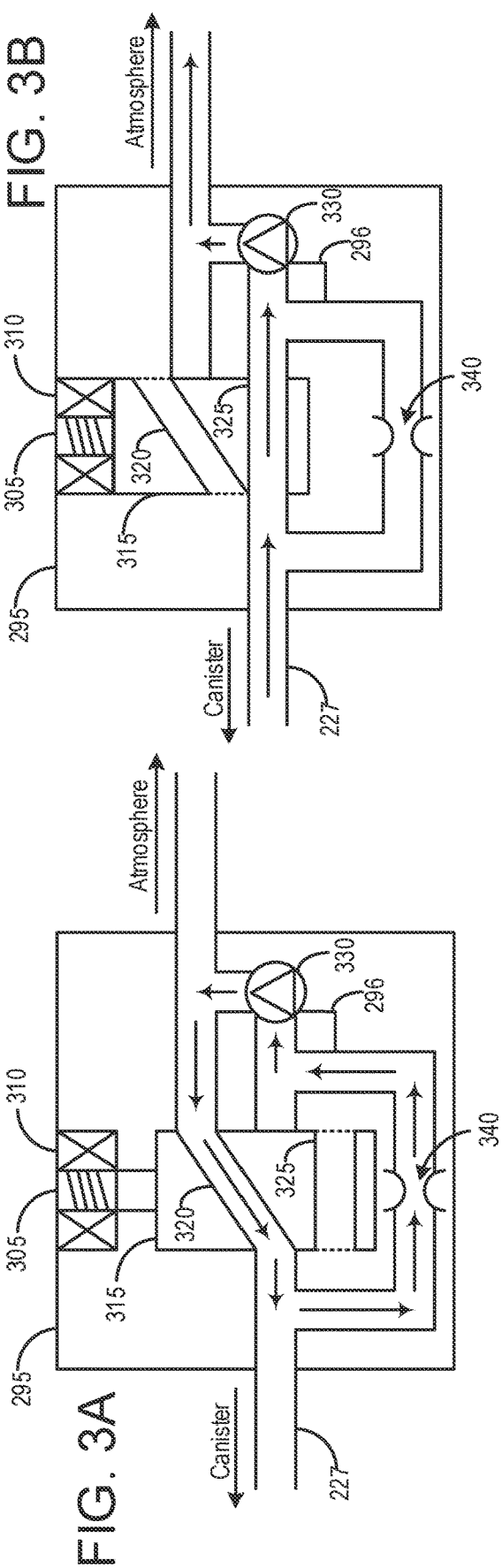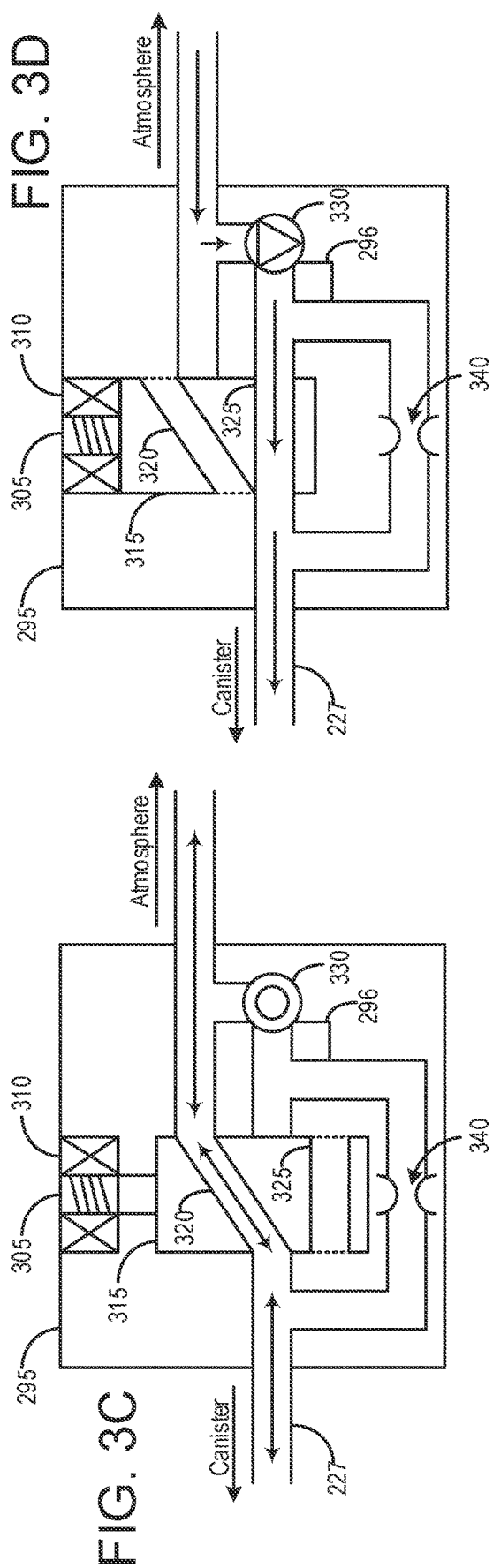

ON-BOARD DIAGNOSTICS MONITOR

FIELD

The present description relates generally to methods and systems for learning characteristics of a road segment and using the learning during a subsequent travel on the road segment to preview the road segment and schedule diagnostic routines to increase in-use monitor performance (IUMP) rates for vehicle system diagnostics.

BACKGROUND/SUMMARY

Vehicles are subjected to onboard diagnostics mandates set by different jurisdictions and regulatory agencies. Certain engine sub-system monitors are to be executed and completed at or above a specified rate and the reported results are subjected to federal/state regulations. Diagnostics may have a completion rate requirement which may be defined by in-use monitor performance (IUMP) rates for diagnostics of each engine sub-system. IUMP may be a ratio of a number of time a diagnostic routine has been executed and completed to a number of drive cycles for the vehicle.

Each diagnostic routine may be carried out during a window of sustained engine operating condition supportive of the diagnostic routine. A diagnostic routine may be initiated upon entry conditions being met. However, the inventors recognizes that the favorable conditions for execution and completion of the diagnostic routine may not sustain throughout the routine. As an example, certain diagnostic routine may be carried out during boosted engine operations and transition of engine operation from boosted to naturally aspirated engine operation while a diagnostic routine is being carried out may cause inaccuracy in the diagnostic routine. A diagnostic routine may provide an erroneous result if it is carried out in a noisy environment which may adversely affect the IUMP rates. Further, in cases with a lack of entry conditions for a diagnostics routine being met, diagnostic routines may not be carried out during certain drive cycles which causes IUMP rates to decrease below mandated levels.

The inventors herein have developed systems and methods to at least in part address the above issues. In one example, the issues described above may be addressed by a method for an engine of a vehicle, comprising: during travel of the vehicle on a road segment of a drive cycle, scheduling a diagnostic routine for an engine sub-system based on statistical parameters for the drive cycle as learned during one or more previous travels of the vehicle on the road segment, and a variable adjustable based on a completion rate of the diagnostic routine. In this way, by learning engine operation for one or more road segments, diagnostic routines may be scheduled for improved completion rates during subsequent travels in the one or more road segments.

As one example, during a drive cycle, one or more road segments may be identified; and during travel in each of the road segments, uninterrupted boosted engine operation and naturally aspirated engine operation events may be characterized. Noise factors during each of the one or more road segments including fuel sloshing, bumpy road conditions etc. may be recorded. Upon completion of a road segment, statistical parameters for that road segment including mean, variance, and a number of events (boosted and naturally aspirated) may be computed. Each time the road segment is traveled, the statistical parameters may be learned and updated. During a subsequent travel on a previously characterized road segment, engine operation on the road segment may be previewed, and a duration for a boosted event and a duration for a naturally event may be predicted based on the statistical parameters computed during previous travels on the same road segment and an adaptive variable (Z score). The Z score may be adjusted based on computed IUMP rates. One or more diagnostic routines may be scheduled during a first or a subsequent window within the road segment best suited for completion of the diagnostic routine. Upon availability of multiple favorable windows within a single drive cycle, one or more diagnostics routines may be planned to be carried out a plurality of times.

In this way, by statistically analyzing boosted engine operation and naturally aspirated engine operation events and noise factors during vehicle operation on a road segment, during subsequent travels on the road segments, engine operation may be previewed and diagnostics routines may be scheduled with an improved possibility of completion. The technical effect of adjusting an adaptive variable (z-score) based on estimated IUMP rates is that the preview of favorable windows for carrying out diagnostic routines may be adjusted in order to increase IUMP rates. Also, by planning to carry out a diagnostic routine multiple times during available favorable windows within a single drive cycle, IUMP ratios may be increased for improved adherence to mandates. Overall, by opportunistically carrying out and completing diagnostic routines in a vehicle, vehicle performance may be closely monitored and mitigating steps may be undertaken as needed to improve vehicle performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a schematic depiction of an evaporative level check module (ELCM) in a configuration to perform a reference check.

FIG. 3B shows a schematic depiction of an ELCM in a configuration to evacuate a fuel system and evaporative emissions system.

FIG. 3C shows a schematic depiction of an ELCM in a configuration that couples a fuel vapor canister to atmosphere.

FIG. 3D shows a schematic depiction of an ELCM in a configuration to pressurize a fuel system and evaporative emissions system.

DETAILED DESCRIPTION

Figure 9:
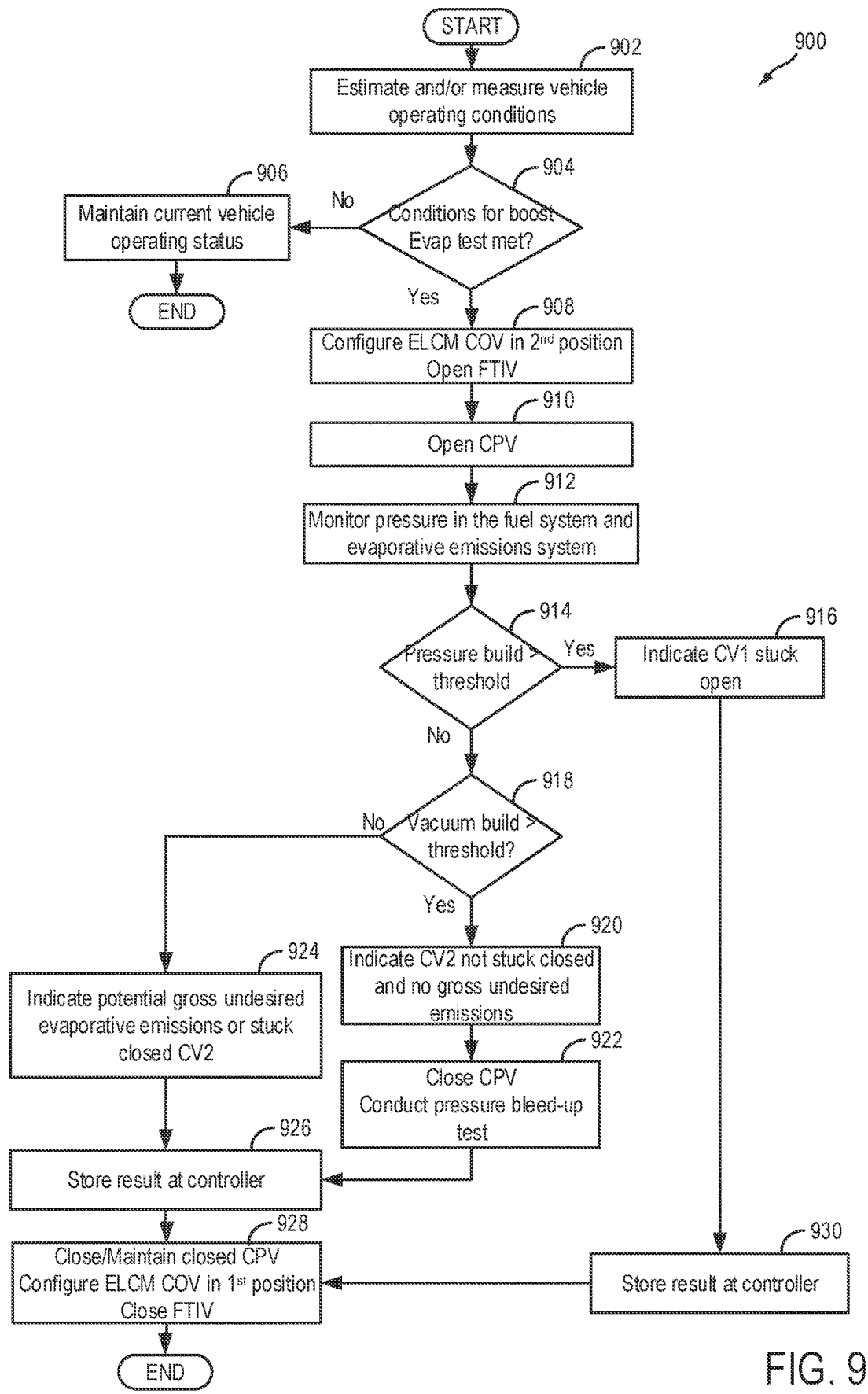
FIG. 9 shows a flow-chart for an example method for carrying out diagnostics of a vehicle fuel system and evaporative emissions system during boosted engine operation.
Figure 10:
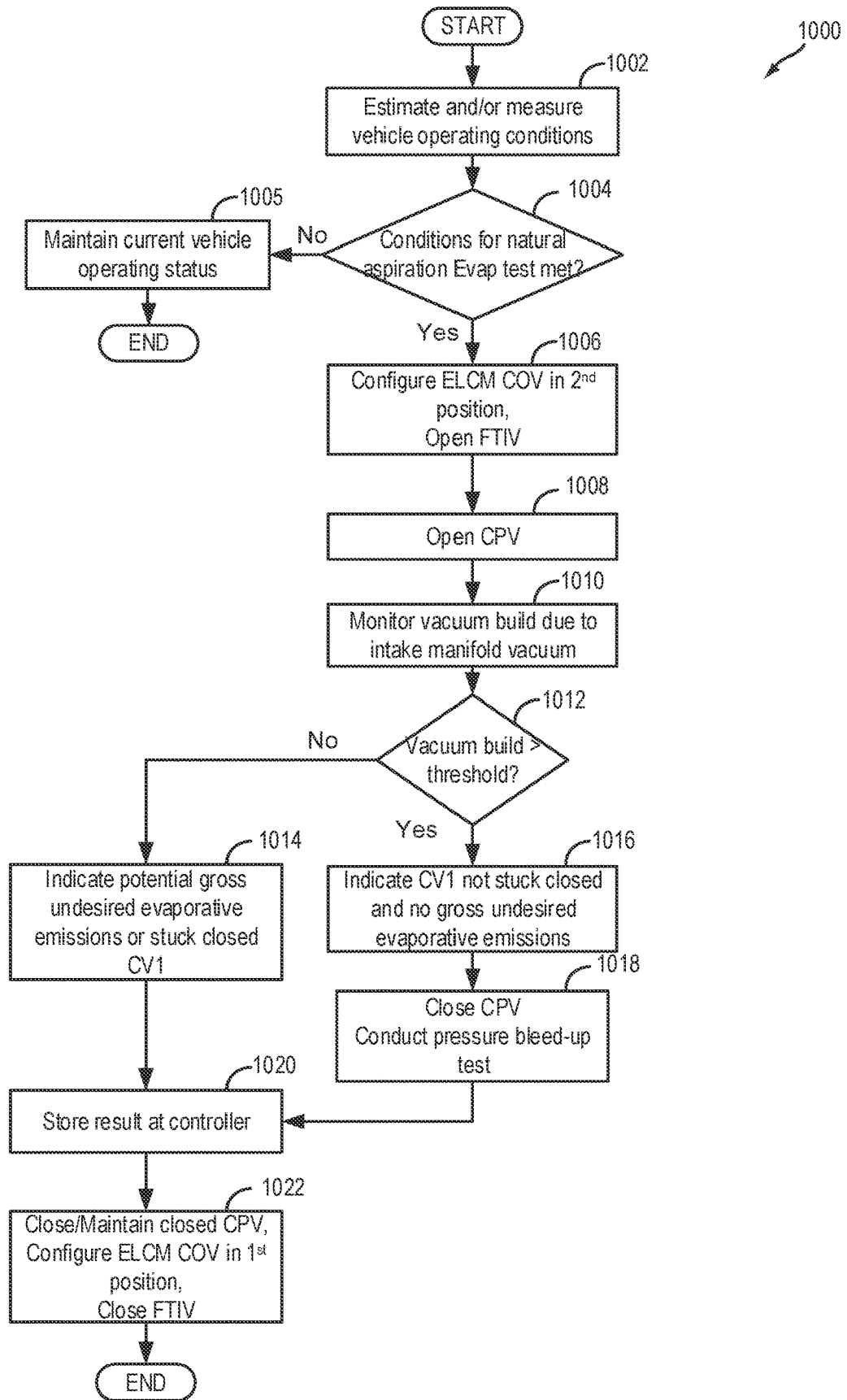
FIG. 10 shows a flow-chart for an example method for carrying out diagnostics of a vehicle fuel system and evaporative emissions system during naturally aspirated engine operation.
Figure 11:
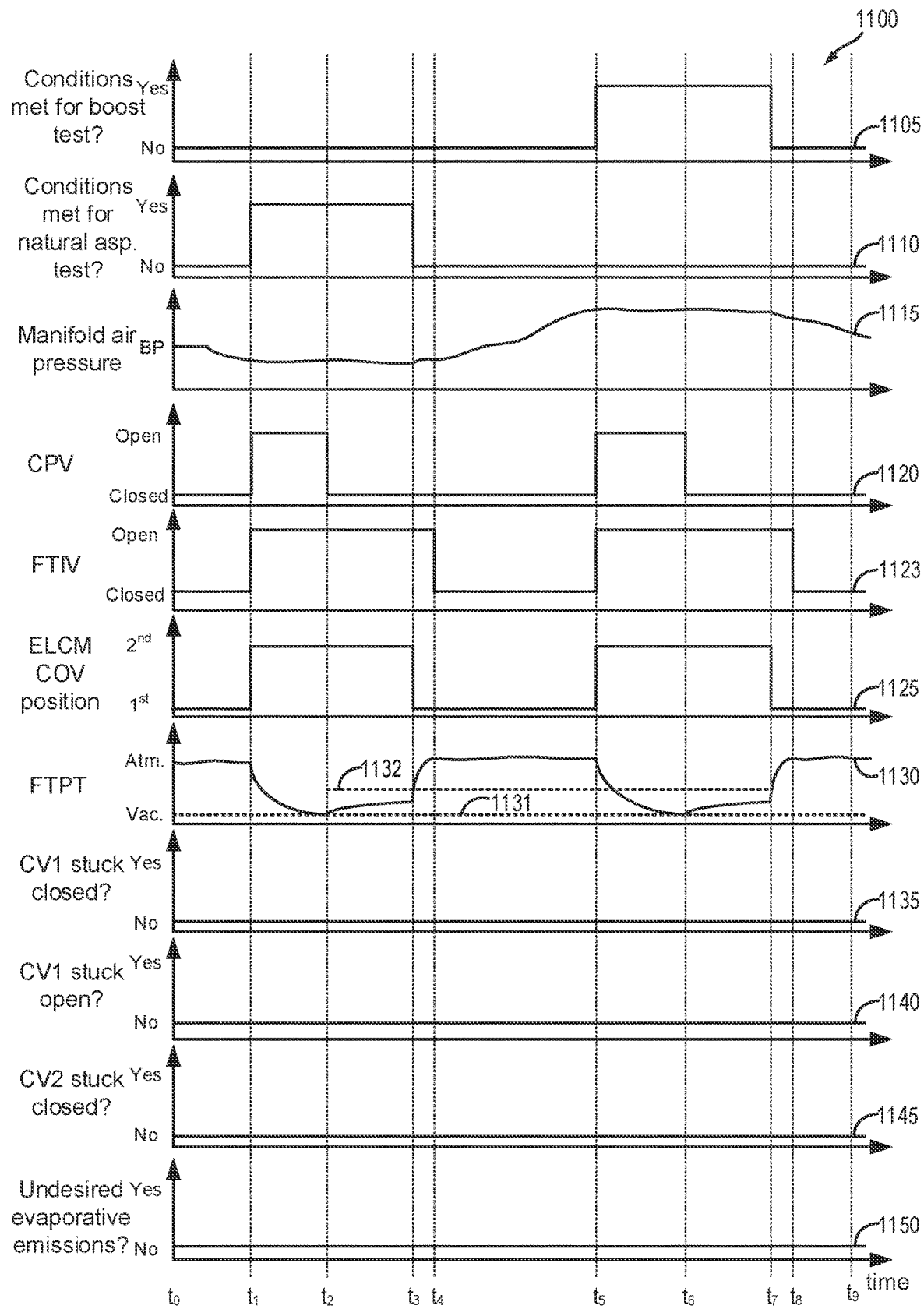
FIG. 11 shows an example timeline for diagnostics of a vehicle fuel system and evaporative emissions system.

The following description relates to systems and methods for learning characteristics of a road segment, and during a subsequent travel on the road segment, using the learnt characteristics to preview the road segment and schedule diagnostic routines. As an example, the diagnostic routines may include a diagnostic routine for components in a vehicle fuel system and evaporative emissions system, such as fuel system and evaporative emissions system depicted at FIG. 1. In some examples, the vehicle system may comprise a hybrid vehicle system, such as that depicted at FIG. 2. To diagnose the vehicle fuel system and evaporative emissions system, an evaporative level check module (ELCM) positioned in a vent line stemming from a fuel vapor canister may be utilized. Such an ELCM may comprise a pump, a changeover valve, and a pressure sensor, and may be configurable in various conformations, depicted in FIGS. 3A-3D. For example, the ELCM pump may be utilized to either evacuate, or pressurize the vehicle fuel system and evaporative emissions system. An electronic circuit, such as that depicted in FIGS. 4A-4B, may be utilized to reverse the direction of the ELCM pump, for example. As elaborated in FIGS. 5-8, a controller may be configured to learn characteristics of a road segment that the vehicle is travelling on and using the learned characteristics to preview an upcoming road segment and schedule diagnostic routines based on the preview. Example diagnostic routines for the vehicle fuel system and evaporative emissions system are shown in FIGS. 9-11.

Figure 1:
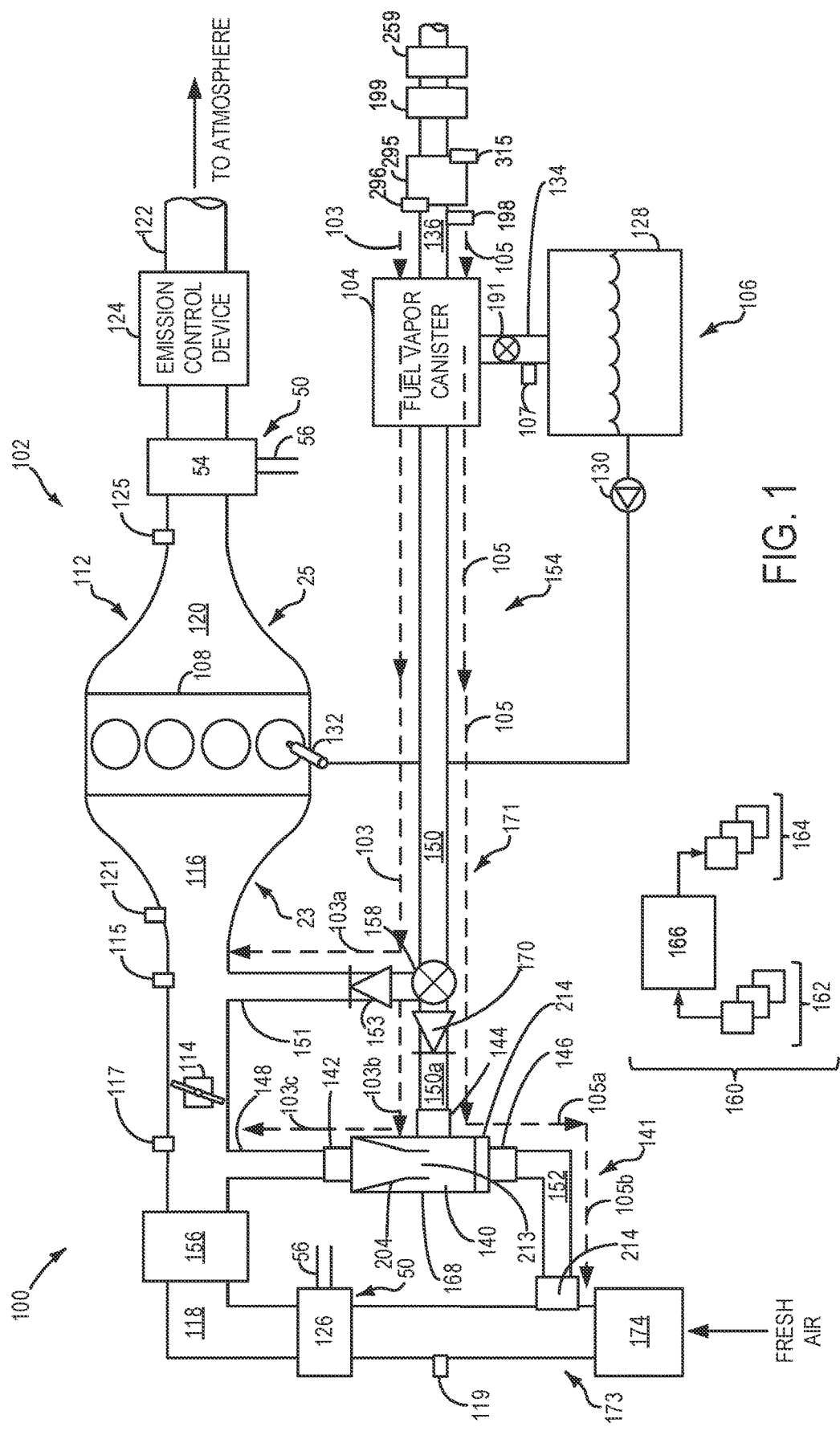
FIG. 1 shows a schematic diagram of a multi-path fuel vapor recovery system of a vehicle system.

Turning to the figures, FIG. 1 shows a schematic depiction of a vehicle system 100. The vehicle system 100 includes an engine system 102 coupled to a fuel vapor recovery system (evaporative emissions control system) 154 and a fuel system 106. The engine system 102 may include an engine 112 having a plurality of cylinders 108. The engine 112 includes an engine intake 23 and an engine exhaust 25. The engine intake 23 includes a throttle 114 fluidly coupled to the engine intake manifold 116 via an intake passage 118. An air filter 174 is positioned upstream of throttle 114 in intake passage 118. The engine exhaust 25 includes an exhaust manifold 120 leading to an exhaust passage 122 that routes exhaust gas to the atmosphere. The engine exhaust 122 may include one or more emission control devices 124, which may be mounted in a close-coupled position in the exhaust. One or more emission control devices may include a three-way catalyst, lean NOx trap, diesel particulate filter, oxidation catalyst, etc. It will be appreciated that other components may be included in the vehicle system, such as a variety of valves and sensors, as further elaborated below.

Throttle 114 may be located in intake passage 118 downstream of a compressor 126 of a boosting device, such as turbocharger 50, or a supercharger. Compressor 126 of turbocharger 50 may be arranged between air filter 174 and throttle 114 in intake passage 118. Compressor 126 may be at least partially powered by exhaust turbine 54, arranged between exhaust manifold 120 and emission control device 124 in exhaust passage 122. Compressor 126 may be coupled to exhaust turbine 54 via shaft 56. Compressor 126 may be configured to draw in intake air at atmospheric air pressure into an air induction system (AIS) 173 and boost it to a higher pressure. Using the boosted intake air, a boosted engine operation may be performed.

An amount of boost may be controlled, at least in part, by controlling an amount of exhaust gas directed through exhaust turbine 54. In one example, when a larger amount of boost is requested, a larger amount of exhaust gases may be directed through the turbine. Alternatively, for example when a smaller amount of boost is requested, some or all of the exhaust gas may bypass turbine 54 via a turbine bypass passage as controlled by wastegate (not shown). An amount of boost may additionally or optionally be controlled by controlling an amount of intake air directed through compressor 126. Controller 166 may adjust an amount of intake air that is drawn through compressor 126 by adjusting the position of a compressor bypass valve (not shown). In one example, when a larger amount of boost is requested, a smaller amount of intake air may be directed through the compressor bypass passage.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to fuel vapor recovery system (evaporative emissions control system) 154, described further below, via conduit 134, before being purged to the engine intake 23.

Fuel vapor recovery system 154 (herein referred to as evaporative emissions control system, or evaporative emissions system) includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. In some examples, vent line 136 may include an air filter 259 disposed therein upstream of a canister 104. In some examples, a canister vent valve (not shown) may be located along vent 136, coupled between the fuel vapor canister and the atmosphere, and may adjust a flow of air and vapors between canister 104 and the atmosphere. However, in other examples, a canister vent valve may not be included. In one example, operation of canister vent valve 172 may be regulated by a canister vent solenoid (not shown). For example, based on whether the canister is to be purged or not, the canister vent valve may be opened or closed.

In some examples, an evaporative level check monitor (ELCM) 295 may be disposed in vent 136 and may be configured to control venting and/or assist in detection of undesired evaporative emissions. Detailed description of ELCM 295 and how ELCM 295 may be selectively configured to control venting and/or assist in detection of undesired evaporative emissions is provided with regard to FIGS. 3A-3D. As an example, ELCM 295 may include a vacuum pump for applying negative pressure to the fuel system when administering a test for undesired evaporative emissions. In some embodiments, the vacuum pump may be configured to be reversible. In other words, the vacuum pump may be configured to apply either a negative pressure or a positive pressure on the evaporative emissions system 154 and fuel system 106. ELCM 295 may further include a reference orifice and a pressure sensor 296. A reference check may thus be performed whereby a vacuum may be drawn across the reference orifice, where the resulting vacuum level comprises a vacuum level indicative of an absence of undesired evaporative emissions. For example, following the reference check, the fuel system 106 and evaporative emissions system 154 may be evacuated by the ELCM vacuum pump. In the absence of undesired evaporative emissions, the vacuum may pull down to the reference check vacuum level. Alternatively, in the presence of undesired evaporative emissions, the vacuum may not pull down to the reference check vacuum level. In other examples, which will be discussed in detail below, the ELCM may be utilized to draw a vacuum on the evaporative emissions system, in order to diagnose whether a second check valve 170 is stuck in an open configuration.

In some examples, evaporative emissions system 154 may further include a bleed canister 199. Hydrocarbons that desorb from canister 104 (also referred to as the "main canister") may be adsorbed within the bleed canister. Bleed canister 199 may include an adsorbent material that is different than the adsorbent material included in main canister 104. Alternatively, the adsorbent material in bleed canister 199 may be the same as that included in main canister 104.

A hydrocarbon sensor 198 may be present in evaporative emissions system 154 to indicate the concentration of hydrocarbons in vent 136. As illustrated, hydrocarbon sensor 198 is positioned between main canister 104 and bleed canister 199. A probe (e.g., sensing element) of hydrocarbon sensor 198 is exposed to and senses the hydrocarbon concentration of fluid flow in vent 136. Hydrocarbon sensor 198 may be used by the engine control system 160 for determining breakthrough of hydrocarbon vapors from main canister 104, in one example.

Furthermore, in some examples, one or more oxygen sensors 121 may be positioned in the engine intake 116, or coupled to the canister 104 (e.g., downstream of the canister), to provide an estimate of canister load. In still further examples, one or more temperature sensors 157 may be coupled to and/or within canister 104. As will be discussed in further detail below, as fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister, and may be used to estimate canister load.

Conduit 134 may optionally include a fuel tank isolation valve 191. Among other functions, fuel tank isolation valve 191 may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof.

Fuel vapor recovery system 154 may include a dual path purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid (not shown). In one example, the duty cycle of the CPV solenoid may be determined by controller 166 responsive to engine operating conditions, including, for example, an air-fuel ratio. By commanding the CPV to be closed, the controller may seal the fuel vapor canister from the fuel vapor purging system, such that no vapors are purged via the fuel vapor purging system. In contrast, by commanding the CPV to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104. During a later engine operation, the stored vapors may be released back into the incoming air charge via fuel vapor purging system 171.

Conduit 150 is coupled to an ejector 140 in an ejector system 141 and includes a second check valve (CV2) 170 disposed therein, in conduit 150a, between ejector 140 and CPV 158. Second check valve (CV2) 170 may prevent intake air from flowing through from the ejector into conduit 150a and conduit 150, while allowing flow of air and fuel vapors from conduit 150 into ejector 140. CV2 170 may be a vacuum-actuated check valve, for example, that opens responsive to vacuum derived from ejector 140.

A conduit 151 couples conduit 150 to intake 23 at a position within conduit 150 between check valve 170 and CPV 158 and at a position in intake 23 downstream of throttle 114. For example, conduit 151 may be used to direct fuel vapors from canister 104 to intake 23 using vacuum generated in intake manifold 116 during a purge event. Conduit 151 may include a first check valve (CV1) 153 disposed therein. First check valve (CV1) 153 may prevent intake air from flowing through from intake manifold 116 into conduit 150, while allowing flow of fluid and fuel vapors from conduit 150 into intake manifold 116 via conduit 151 during a canister purging event. CV1 may be a vacuum actuated check valve, for example, that opens responsive to vacuum derived from intake manifold 116.

Conduit 148 may be coupled to ejector 140 at a first port or inlet 142. Ejector 140 includes a second port 144 or inlet coupling ejector 140 to conduit 150a and conduit 150. Ejector 140 is coupled to intake 23 at a position upstream of throttle 114 and downstream of compressor 126 via a conduit 148. During boost conditions, conduit 148 may direct compressed air in intake conduit 118 downstream of compressor 126 into ejector 140 via port 142.

Ejector 140 may also be coupled to intake conduit 118 at a position upstream of compressor 126 via a shut-off valve 214. Shut-off valve 214 is hard-mounted directly to air induction system 173 along conduit 118 at a position between air filter 174 and compressor 126. For example, shut-off valve 214 may be coupled to an existing AIS nipple or other orifice, e.g., an existing SAE male quick connect port, in AIS 173. Hard-mounting may include a direct mounting that is inflexible. For example, an inflexible hard mount could be accomplished through a multitude of methods including spin welding, laser bonding, or adhesive. Shut-off valve 214 is coupled to a third port 146 or outlet of ejector 140. Shut-off valve 214 is configured to close in response to undesired emissions detected downstream of outlet 146 of ejector 140. As shown in FIG. 1, in some examples, a conduit or hose 152 may couple the third port 146 or outlet of ejector 140 to shut-off valve 214. In this example, if a disconnection of shut-off valve 214 with AIS 173 is detected, then shut-off valve 214 may close so air flow from the engine intake downstream of the compressor through the converging orifice in the ejector is discontinued. However, in other examples, shut-off valve may be integrated with ejector 140 and directly coupled thereto.

Ejector 140 includes a housing 168 coupled to ports 146, 144, and 142. In one example, only the three ports 146, 144, and 142 are included in ejector 140. Ejector 140 may include various check valves disposed therein. For example, in some examples, ejector 140 may include a check valve positioned adjacent to each port in ejector 140 so that unidirectional flow of fluid or air is present at each port. For example, air from intake conduit 118 downstream of compressor 126 may be directed into ejector 140 via inlet port 142 and may flow through the ejector and exit the ejector at outlet port 146 before being directed into intake conduit 118 at a position upstream of compressor 126. This flow of air through the ejector may create a vacuum due to the Venturi effect at inlet port 144 so that vacuum is provided to conduit 150a and conduit 150 via port 144 during boosted operating conditions. In particular, a low pressure region is created adjacent to inlet port 144 which may be used to draw purge vapors from the canister into ejector 140.

Ejector 140 includes a nozzle 204 comprising an orifice which converges in a direction from inlet 142 toward suction inlet 144 so that when air flows through ejector 140 in a direction from port 142 towards port 146, a vacuum is created at port 144 due to the Venturi effect. This vacuum may be used to assist in fuel vapor purging during certain conditions, e.g., during boosted engine conditions. In one example, ejector 140 is a passive component. That is, ejector 140 is designed to provide vacuum to the fuel vapor purge system via conduit 150a and conduit 150 to assist in purging under various conditions, without being actively controlled. Thus, whereas CPV 158 and throttle 114 may be controlled via controller 166, for example, ejector 140 may be neither controlled via controller 166 nor subject to any other active control. In another example, the ejector may be actively controlled with a variable geometry to adjust an amount of vacuum provided by the ejector to the fuel vapor recovery system via conduit 150a and conduit 150.

During select engine and/or vehicle operating conditions, such as after an emission control device light-off temperature has been attained (e.g., a threshold temperature reached after warming up from ambient temperature) and with the engine running, the controller 166 may control an ELCM 295 changeover valve (COV) 315 (see FIGS. 3A-3D for detailed description) to enable fuel vapor canister 104 to be fluidically coupled to atmosphere. For example, ELCM COV 315 may be configured in a first position, where the first position includes the fuel vapor canister 104 fluidically coupled to atmosphere, except during pressure tests performed on the system (described in further detail below). At the same time, controller 12 may adjust the duty cycle of the CPV solenoid (not shown) and open CPV 158. Pressures within fuel vapor purging system 171 may then draw fresh air through vent 136, fuel vapor canister 104, and CPV 158 such that fuel vapors flow into conduit 150.

The operation of ejector 140 within fuel vapor purging system 171 during vacuum conditions will now be described. The vacuum conditions may include intake manifold vacuum conditions. For example, intake manifold vacuum conditions may be present during an engine idle condition, with manifold pressure below atmospheric pressure by a threshold amount. This vacuum in the intake system 23 may draw fuel vapor from the canister through conduits 150 and 151 into intake manifold 116, as represented by dashed line(s) 103 and 103a. Further, at least a portion of the fuel vapors may flow from conduit 150 into ejector 140 via port 144 via dashed line(s) 103, 103b, and 103c. Upon entering the ejector via port 144, the fuel vapors may flow through nozzle 204 toward port 142. Specifically, the intake manifold vacuum causes the fuel vapors to flow through orifice 213. Because the diameter of the area within the nozzle gradually increases in a direction from port 144 towards port 142, the fuel vapors flowing through the nozzle in this direction diffuse, which raises the pressure of the fuel vapors. After passing through the nozzle, the fuel vapors exit ejector 140 through first port 142 and flow through duct 148 to intake passage 118 and then to intake manifold 116, indicated by dashed line 103c.

Next, the operation of ejector 140 within fuel vapor purging system 171 during boost conditions will be described. The boost conditions may include conditions during which the compressor is in operation. For example, the boost conditions may include one or more of a high engine load condition and a super-atmospheric intake condition, with intake manifold pressure greater than atmospheric pressure by a threshold amount.

Fresh air enters intake passage 118 at air filter 174. During boost conditions, compressor 126 pressurizes the air in intake passage 118, such that intake manifold pressure is positive. Pressure in intake passage 118 upstream of compressor 126 is lower than intake manifold pressure during operation of compressor 126, and this pressure differential induces a flow of fluid from intake conduit 118 through duct 148 and into ejector 140 via ejector inlet 142. This fluid may include a mixture of air and fuel, in some examples. After the fluid flows into the ejector via the port 142, it flows through the converging orifice 213 in nozzle 204 in a direction from port 142 towards outlet 146. Because the diameter of the nozzle gradually decreases in a direction of this flow, a low pressure zone is created in a region of orifice 213 adjacent to suction inlet 144. The pressure in this low pressure zone may be lower than a pressure in duct 150a and 150. When present, this pressure differential provides a vacuum to conduit 150 to draw fuel vapor from canister 104, as indicated via dashed line(s) 105. This pressure differential may further induce flow of fuel vapors from the fuel vapor canister, through the CPV, and into port 144 of ejector 140. Upon entering the ejector, the fuel vapors may be drawn along with the fluid from the intake manifold out of the ejector via outlet port 146 and into intake 118 at a position upstream of compressor 126, as indicated via dashed lines 105a and 105b. Operation of compressor 126 then draws the fluid and fuel vapors from ejector 140 into intake passage 118 and through the compressor. After being compressed by compressor 126, the fluid and fuel vapors flow through charge air cooler 156, for delivery to intake manifold 116 via throttle 114.

Thus, herein, it may be understood that the fuel vapor canister may be coupled to an air intake of the engine through a first path having a first check valve 153, where the first path may include conduits 150 and 151. Furthermore, it may be understood that the fuel vapor canister may be coupled to an air intake of the engine through a second path having a second check valve 170. The second path may include conduits 150, and 150a. The second path may further include conduits 152, 118, and 148.

Vehicle system 100 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23. For example, a pressure or airflow sensor 115 in intake conduit 118 downstream of throttle 114, a pressure or air flow sensor 117 in intake conduit 118 between compressor 126 and throttle 114, and a pressure or air flow sensor 119 in intake conduit 118 upstream of compressor 126. In some examples, pressure sensor 119 may comprise a dedicated barometric pressure sensor. Other sensors such as additional pressure, temperature, air/fuel ratio, and composition sensors may be coupled to various locations in the vehicle system 100. As another example, actuators 164 may include fuel injectors 132, throttle 114, compressor 126, a fuel pump of pump system 130, etc. The control system 160 may include an electronic controller 166. The controller may receive input data from the various sensors, process the input data, and trigger the actuators in response to the processed input data based on instruction or code programmed therein corresponding to one or more routines.

Diagnostic tests may be periodically performed on various engine sub-systems including the evaporative emissions control system 154 and fuel system 106. Diagnostic routine may be carried out upon certain entry conditions being met and upon availability of a window of favorable conditions over a duration of a diagnostic routine. Diagnostic routines may have a completion rate requirement which may be defined by in-use monitor performance (IUMP) rates for diagnostics of each engine sub-system. IUMP may be a ratio of a number of time a diagnostic routine has been executed and completed (numerator) to a number of drive cycles for the vehicle (denominator). Therefore, if a diagnostic routine may not be completed within a drive cycle due to reasons including termination of a diagnostic routine due to a noise factor, the denominator of IUMP may increase while the numerator may remain the same. In order to maintain a high IUMP and meet regulatory requirements, it is desired to be able to successfully carry out diagnostics one or more times during a drive cycle. In order to maximize completion of a diagnostic routine, it may be scheduled during a predicted favorable window with minimal noise factors such that the diagnostic routine can be carried out within a shorter duration and is not terminated prior to completion.

While travelling on a frequently travelled road segment, the road segment may be identified and assigned an identifier, and statistical parameters including each of a first number of boosted events during which the engine is operated under boosted conditions, a second number of naturally aspirated events during which the engine is operated under naturally aspirated condition, a first mean of durations of the boosted events, a second mean of durations of the naturally aspirated events, a first variance of the durations of the boosted events, and the second variance of the durations of the naturally aspirated events for the road segment may be learned. Upon completion of travel on the road segment each of the first number of boosted events, the second number of naturally aspirated events, the first mean, the second mean, the first variance, and the second variance may be updated based on the learning. During a subsequent travel on the road segment, one or more boosted events during may be predicted based on the first number of boosted events, the updated first mean, the updated first variance, and the variable (Z score), and a diagnostic routine may be scheduled during the one or more predicted boosted events. Similarly, during subsequent travel on the road segment, one or more naturally aspirated events during may be predicted based on the second number of naturally aspirated events, the updated second mean, the updated second variance, and the variable (Z score), and a diagnostic routine may be scheduled during the one or more predicted naturally aspirated events. One of the predicted boosted events with a lower than threshold load in the vapor storage canister and/or one of the predicted naturally aspirated events with a lower than threshold load in the vapor storage canister may be selected for carrying out the diagnostic routine.

Upon completion of the diagnostic routine, the completion rate (as represented by the LUMP ratio) of the diagnostic routine may be estimated, and in response to the completion rate being lower than a threshold, the diagnostic routine may be repeated during the predicted one or more boosted events and/or the predicted one or more naturally aspirated events. In this way, during a drive cycle, a diagnostic routine may be opportunistically carried out multiple times to improve the LUMP ratio. further, in response to the completion rate of the diagnostic routine upon completion of the drive cycle decreasing relative to the completion rate of the diagnostic routine during an immediately previous drive cycle, a value of the variable (Z score) may be decreased until the completion rate increases above the threshold and plateaus, and then the value of the variable (Z score) may be maintained for the subsequent drive cycles. In response to the completion rate of the diagnostic routine decreasing below the threshold after plateauing (upon decreasing the value of the Z score), the value of the variable (Z score) may be increased. The value of the variable may be adjusted between −5 and +5.

As an example, in this disclosure, diagnostic routines for the evaporative emissions control system 154 and fuel system 106 are discussed. However, in alternate examples, diagnostic routine for each engine sub-system including EGR diagnostics, catalyst diagnostics, cylinder imbalance detection, etc. may be scheduled based on the learned characteristics of the road segment. Further, two or more diagnostic routines that are not affected by each other may be scheduled to be carried out simultaneously during a drive cycle. In one example diagnostics for a turbocharger system (such as exhaust turbine, wastegate, etc.) may be carried out in parallel with the evaporative emissions control system 154 and fuel system 106 diagnostics.

In one example, under natural aspiration conditions (e.g. intake manifold vacuum conditions), ELCM COV 315 may be configured in a second position (e.g. closed) to seal the fuel vapor canister 104 from atmosphere, and CPV 158 may be commanded open. By commanding ELCM COV 315 to the second position and commanding open CPV 158 during natural aspiration conditions, the evaporative emissions control system 154 and fuel system 106 may be evacuated (as indicated via dashed lines 103, and 103*a*) in order to ascertain the presence or absence of undesired evaporative emissions, by monitoring pressure in the fuel system and evaporative emissions control system. Pressure in the fuel system and evaporative emissions control system may be monitored, for example, via a pressure sensor 107. In some examples pressure sensor 107 may comprise a fuel tank pressure transducer (FTPT). If a threshold vacuum (e.g. negative pressure threshold with respect to atmospheric pressure) is reached during evacuating the evaporative emissions control system 154 and fuel system 106, an absence of gross undesired evaporative emissions may be indicated. Furthermore, if the threshold vacuum is reached, then it may be indicated that the first check valve (CV1) 153 is not stuck closed or substantially closed, as in a case where CV1 153 is stuck closed, pressure sensor 107 may not indicate pressure changes.

In another example, under boost conditions (e.g. intake manifold pressure greater than barometric pressure by a predetermined threshold), again the ELCM COV 315 may be commanded to the second (e.g. closed) position, and the CPV 158 may be commanded open. By commanding closed the CVV 172 and commanding open the CPV 158 during boost conditions, the evaporative emissions control system 154 and fuel system 106 may be evacuated (as indicated via dashed lines 105) in order to ascertain the presence or absence of undesired evaporative emissions. As discussed above, pressure in the fuel system and evaporative emissions control system may be monitored via, for example, pressure sensor 107. If a threshold vacuum (e.g., negative pressure threshold with respect to atmospheric pressure) is reached during evacuating the evaporative emissions control system 154 and fuel system 106, an absence of gross undesired evaporative emissions may be indicated. Furthermore, if the threshold vacuum is reached, then it may be indicated that the second check valve (CV2) 170 is not stuck closed or substantially closed, as in a case where CV2 170 is stuck closed, pressure sensor 107 may not indicate pressure changes.

Figure 2:
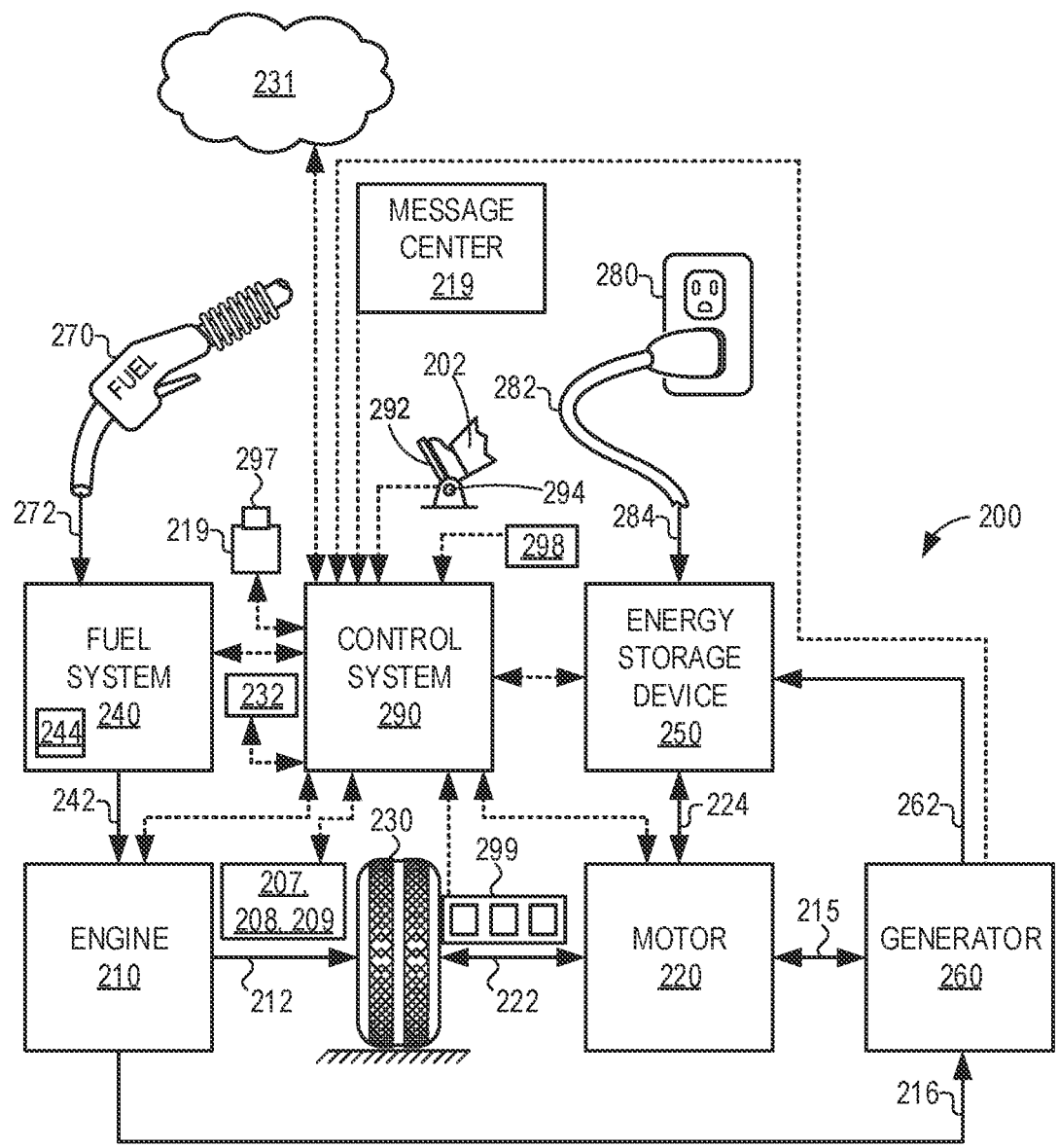
FIG. 2 schematically shows an example vehicle propulsion system.

FIG. 2 illustrates an example vehicle propulsion system 200. It may be understood that vehicle propulsion system 200 may comprise the same vehicle propulsion system as vehicle propulsions system 100 depicted at FIG. 1. Vehicle propulsion system 200 includes a fuel burning engine 210 and a motor 220. It may be understood that engine 210 may be the same as engine 112 depicted above at FIG. 1. As a non-limiting example, engine 210 comprises an internal combustion engine and motor 220 comprises an electric motor. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262.

During still other operating conditions, engine 210 may be operated by combusting fuel received from fuel system 240 as indicated by arrow 242. It may be understood that fuel system 240 may comprise the same fuel system as fuel system 106 depicted above at FIG. 1. For example, engine 210 may be operated to propel the vehicle via drive wheel 230 as indicated by arrow 212 while motor 220 is deactivated. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated to power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 215 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

Fuel system 240 may include one or more fuel storage tanks 244 for storing fuel on-board the vehicle. It may be understood that fuel storage tanks 244 may comprise the same fuel storage tank as fuel tank 128 depicted at FIG. 1. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 290 may communicate with one or more of engine 210, motor 220, fuel system 240, energy storage device 250, and generator 260. It may be understood that control system 290 may comprise the same control system as control system 160, depicted above at FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. Control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnected between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 219.

The vehicle propulsion system 200 may also include an ambient temperature/humidity sensor 298, and sensors dedicated to indicating the occupancy-state of the vehicle, for example seat load cells 207, door sensing technology 208, and onboard cameras 209. Vehicle propulsion system 200 may further include a roll stability control sensor, such as a lateral and/or longitudinal and/or yaw rate sensor(s) 299. The vehicle instrument panel 219 may include indicator light(s) and/or a text-based display in which messages are displayed to an operator. The vehicle instrument panel 219 may also include various input portions for receiving an operator input, such as buttons, touch screens, voice input/recognition, etc. For example, the vehicle instrument panel 219 may include a refueling button 297 which may be manually actuated or pressed by a vehicle operator to initiate refueling. For example, in response to the vehicle operator actuating refueling button 297, a fuel tank in the vehicle may be depressurized so that refueling may be performed (in an example where the vehicle includes a fuel tank isolation valve).

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast and receive information regarding vehicle data, vehicle diagnostics, traffic conditions, current and future road work/closure schedule, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art.

Vehicle system 200 may also include an on-board navigation system 232 (for example, a Global Positioning System) that an operator of the vehicle may interact with. As an example, at the initiation of and/or during a drive cycle, the operator may input a destination to the navigation system and plan a travel route following the navigation system 232. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

FIGS. 3A-3D show a schematic depiction of an example ELCM 295 in various conditions in accordance with the present disclosure. As shown in FIG. 2, ELCM 295 may be located along vent 136 between canister 104 and atmosphere. ELCM 295 includes a changeover valve (COV) 315, a pump 330, and a pressure sensor 296. Pump 330 may be a reversible pump, for example, a vane pump. COV 315 may be moveable between a first a second position. In the first position, as shown in FIGS. 3A and 3C, air may flow through ELCM 295 via first flow path 320. In the second position, as shown in FIGS. 3B and 3D, air may flow through ELCM 295 via second flow path 325. The position of COV 315 may be controlled by solenoid 310 via compression spring 305. ELCM 295 may also comprise reference orifice 340. Reference orifice 340 may have a diameter corresponding to the size of a threshold for undesired evaporative emissions to be tested, for example, 0.02". In either the first or second position, pressure sensor 296 may generate a pressure signal reflecting the pressure within ELCM 295. Operation of pump 330 and solenoid 310 may be controlled via signals received from controller.

As shown in FIG. 3A, COV 315 is in the first position, and pump 330 is activated in a first direction. Air flow through ELCM 295 in this configuration is represented by arrows. In this configuration, pump 330 may draw a vacuum on reference orifice 340, and pressure sensor 296 may record the vacuum level within ELCM 295. This reference check vacuum level reading may then become the threshold for the presence or absence of undesired evaporative emissions in a subsequent evaporative emissions test diagnostic.

As shown in FIG. 3B, COV 315 is in the second position, and pump 330 is activated in the first direction. This configuration allows pump 330 to draw a vacuum on fuel system 106 and evaporative emissions system 154. In examples where fuel system 218 includes a fuel tank isolation valve (e.g. 191), the fuel tank isolation valve (FTIV) may be opened to allow pump 330 to draw a vacuum on fuel tank 128. Air flow through ELCM 295 in this configuration is represented by arrows. In this configuration, as pump 330 pulls a vacuum on fuel system 106 and evaporative emissions system 154, the absence of undesired evaporative emissions in the system should allow for the vacuum level in ELCM 295 to reach or exceed the previously determined reference vacuum threshold. In the presence of undesired evaporative emissions larger than the reference orifice, the pump will not pull down to the reference check vacuum level.

As shown in FIG. 3C, COV 315 is in the first position, and pump 330 is de-activated. This configuration allows for air to freely flow between atmosphere and the canister. This configuration may be used during a canister purging operation, for example, and may additionally be used during vehicle operation when a purging operation is not being conducted, and when the vehicle is not in operation.

As shown in FIG. 3D, COV 315 is in the second position, and pump 330 is activated in a second direction, opposite from the first direction. In this configuration, pump 330 may pull air from atmosphere into fuel system 218 and evaporative emission system 251. In a configuration where FTIV 252 is open and CPV 261 is closed, air drawn by pump 330 may promote desorption of fuel vapor from canister 222, and further direct the desorbed fuel vapor into the fuel tank. In this way, fuel vapor may be purged from the canister to the fuel tank, thereby decreasing the potential for bleed emissions.

Still further, while not explicitly illustrated, when the COV 315 is in the second position and pump 330 is off, the fuel system 106 and evaporative emissions system 154 may be understood to be sealed from atmosphere. Accordingly, the COV 315 when configured in the second position with pump 330 off, may function similar to a canister vent valve (not shown) when the canister vent valve is in a closed configuration.

Figure 4A:
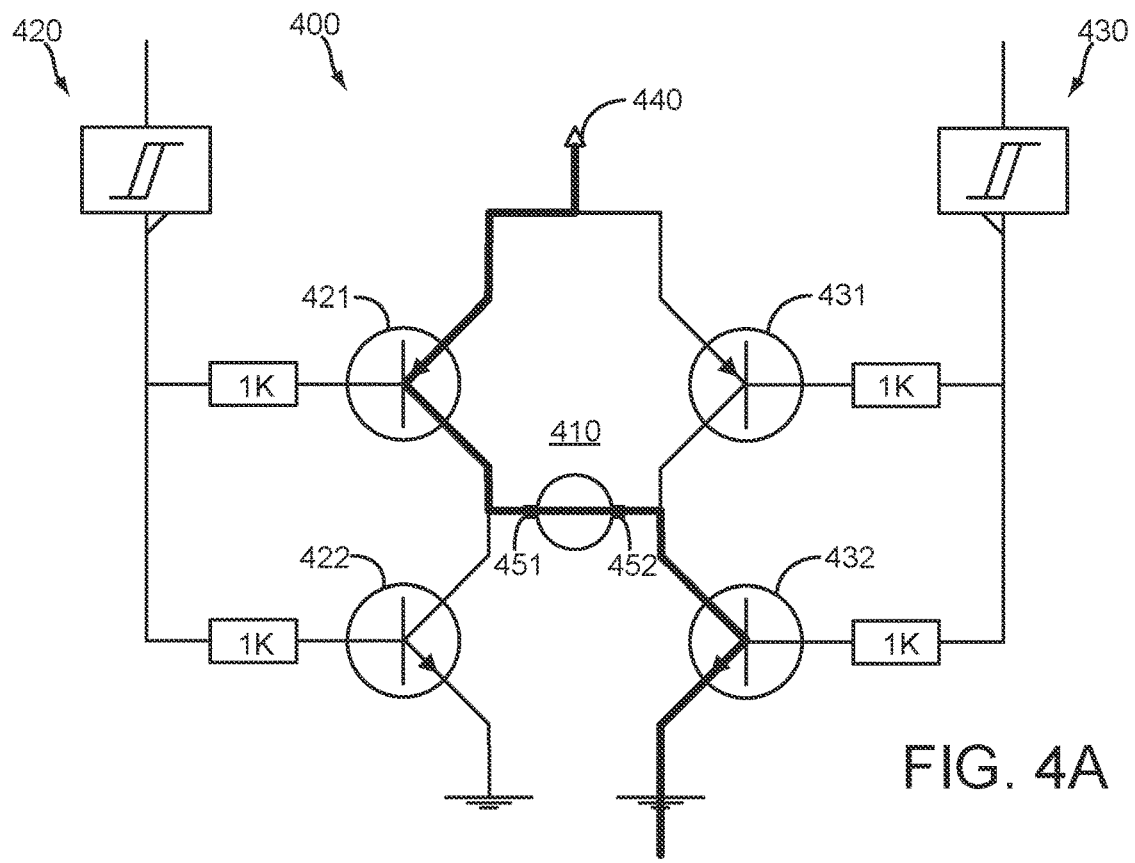
FIGS. 4A-4B show a schematic depiction of an electronic circuit configured to reverse the spin orientation of an electric motor.
Figure 4B:
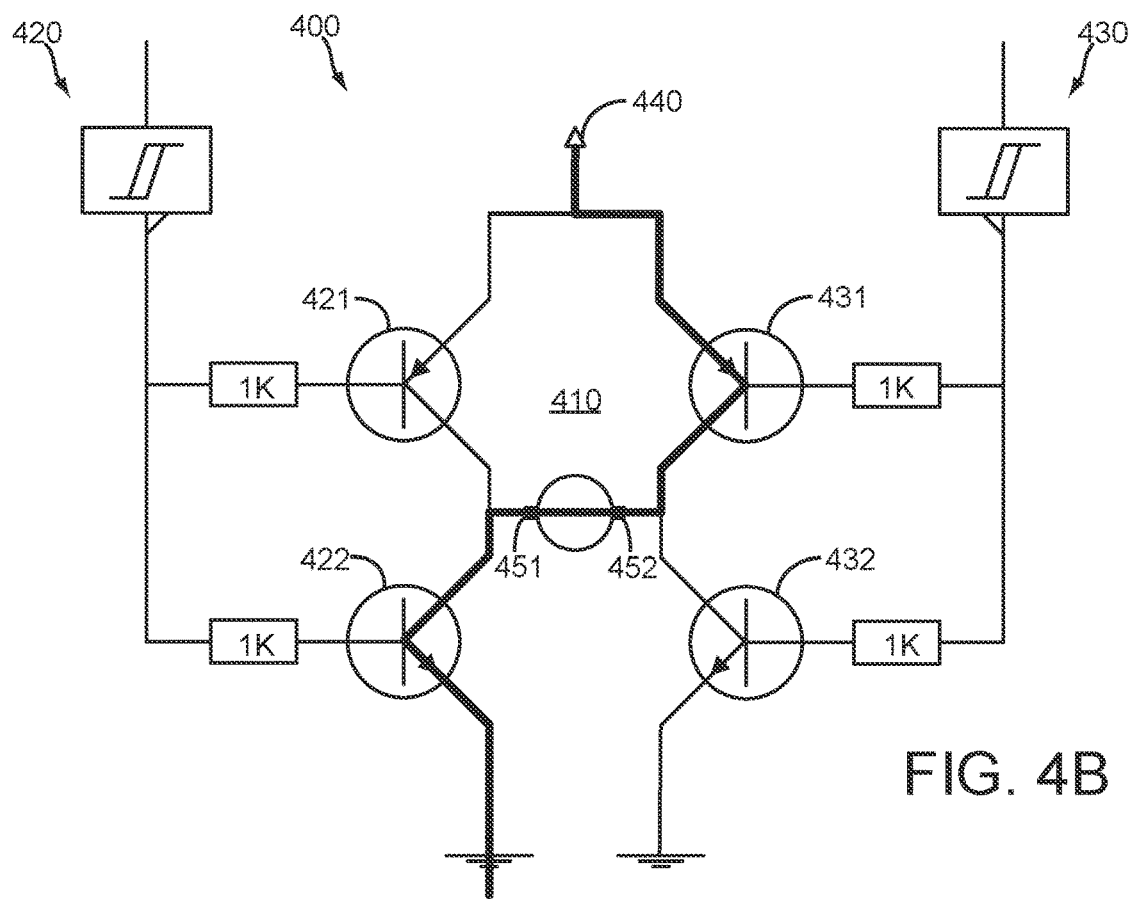

FIGS. 4A and 4B show an example circuit 400 that may be used for reversing pump motor of ELCM 295. Circuit 400 schematically depicts an H-Bridge circuit that may be used to run a motor 410 in a first (forward) direction and alternately in a second (reverse) direction. Circuit 400 comprises a first (LO) side 420 and a second (HI) side 430. Side 420 includes transistors 421 and 422, while side 430 includes transistors 431 and 432. Circuit 400 further includes a power source 440.

In FIG. 4A, transistors 421 and 432 are activated, while transistors 422 and 431 are off. In this confirmation, the left lead 451 of motor 410 is connected to power source 440, and the right lead 452 of motor 410 is connected to ground. In this way, motor 410 may run in a forward direction. For example, the forward direction. In some examples, the forward direction may comprise the ELCM 295 drawing vacuum on the fuel system and evaporative emissions system, such as depicted above at FIG. 3B.

In FIG. 4B, transistors 422 and 431 are activated, while transistors 421 and 432 are off. In this confirmation, the right lead 452 of motor 410 is connected to power source 440, and the left lead 451 of motor 410 is connected to ground. In this way, motor 400 may run in a reverse direction. In some examples, the reverse direction may comprise the ELCM 295 applying positive pressure with respect to atmospheric pressure the fuel system and evaporative emissions system, such as depicted above at FIG. 3D.

In this way, the systems in FIGS. 1-4B provide for a system for a vehicle, comprising: an engine operable under boosted and natural aspiration conditions, and a controller storing instructions in non-transitory memory that, when executed, cause the controller to: during travel on an identified road segment previously characterized during one or more prior travels of the vehicle along the road segment, preview boosted engine operation and naturally aspirated engine operation during travel on the identified road segment based on statistical parameters of an identified road segment previously characterized during the one or more prior travels of the vehicle along the road segment, and schedule a diagnostic routine for a fuel system including a fuel tank selectively coupled to an evaporative emissions system based on each of the previewed boosted engine operation and naturally aspirated engine operation, a state of loading of a fuel vapor storage canister positioned in the evaporative emissions system, and a variable adjustable based on a completion rate of the diagnostic routine.

Figure 5:
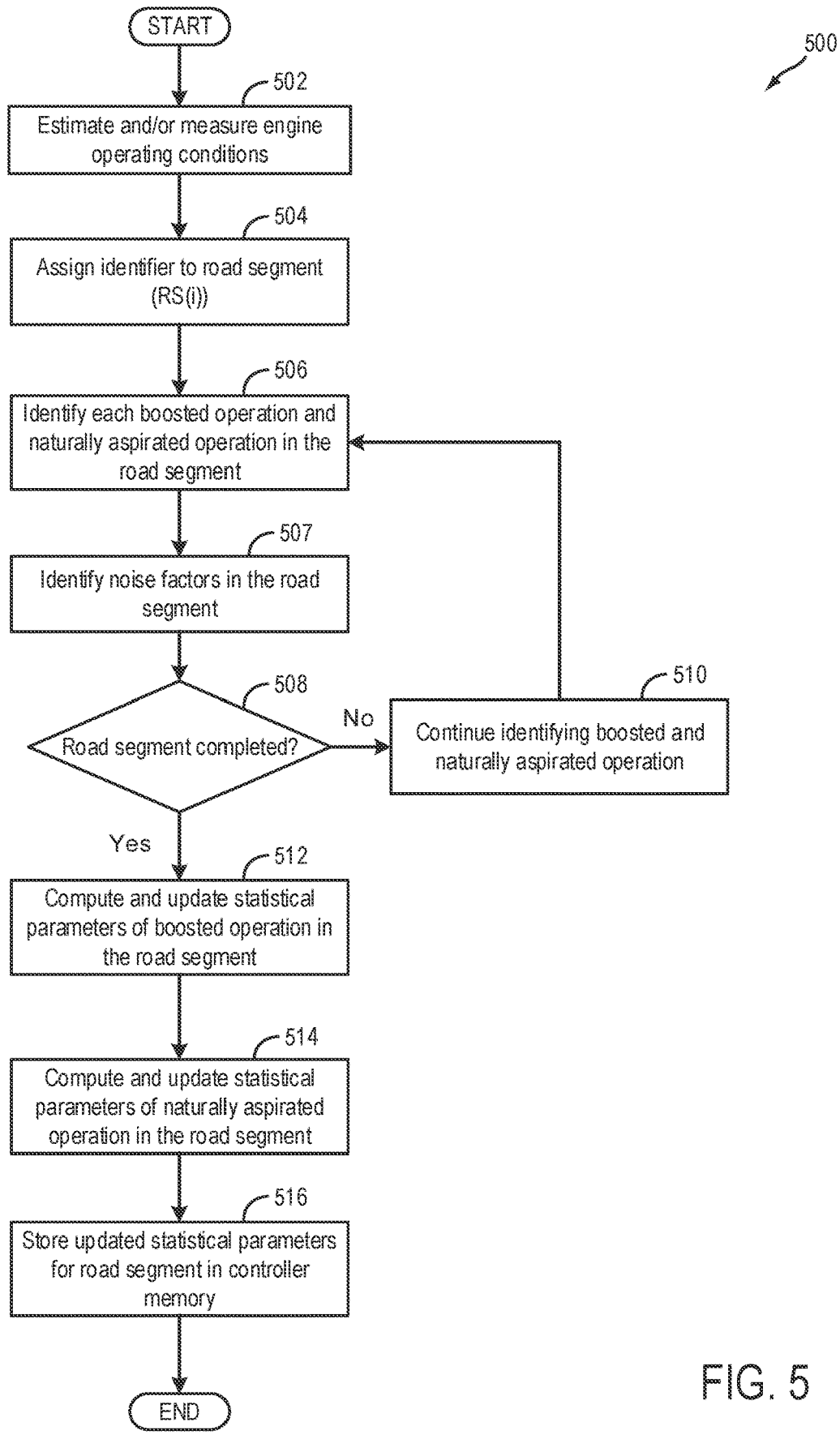
FIG. 5 shows a flowchart for an example method for learning characteristics of a road segment.

FIG. 5 shows an example method 500 for learning characteristics of a road segment to be used for previewing the road segment and scheduling diagnostic routines during subsequent travels on the road segment. Method 500 will be described with reference to the systems described herein and shown in FIGS. 1-4B, though it should be understood that similar methods may be applied to other systems without departing from the scope of this disclosure. Method 500 may be carried out by a controller, such as controller 166 in FIG. 1, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-3D.

At 502, the routine includes estimating and/or measuring vehicle and engine operating conditions including vehicle speed, accelerator pedal position, engine speed, engine torque, engine temperature, exhaust turbine speed, intake compressor speed, manifold pressure, throttle opening, etc. Further ambient conditions including ambient temperature and humidity may be estimated.

At 504, the road segment that the vehicle is travelling on may be assigned with an unique identifier (RS(i)). A road segment may be a specific representation of a portion of a road with uniform characteristics. A drive cycle from an origin to a destination may be divided into one or more road segments. In one example, the destination may be indicated by the operator via a navigation system and the road segment may be part of a travel route proposed by the navigation system. In another example, the road segment may be a frequently travelled road segment such as a part of a route travelled by the operator at a regular frequency such as between home and office. Frequently travelled routes and road segments may be identified by the controller based on repeated travel along the road segments which may also occur at specific times of the day. If the road segment that the vehicle is travelling on is a frequently travelled road segment, the controller may retrieve the unique identifier for the road from the controller memory.

At 506, the routine includes identifying each boosted engine operation event and naturally aspirated engine operation event during travel in the identified road segment. Boosted engine operation may be identified by an indication of manifold air pressure (MAP) being greater than barometric pressure (BP) by a predetermined non-zero threshold amount (intake manifold under higher pressure conditions). In some examples, identifying boosted engine operation may include MAP greater than BP by a predetermined threshold for a predetermined time duration. Further, boosted engine operation may be identified by a non-zero exhaust turbine speed and a non-zero intake compressor speed (both turbine and compressor spinning to provide boost). Naturally aspirated engine operation may be identified by an indication that the MAP is lower than BP by a pre-determined threshold amount (intake manifold under lower pressure/vacuum conditions). In some examples, identifying naturally aspirated engine operation may include MAP being lower than BP by the predetermined threshold for a predetermined time duration. Further, naturally aspirated engine operation may be identified by the exhaust turbine and the intake compressor being stationary.

The portions of the road segment where the engine is operated under naturally aspirated or boosted conditions may be identified and saved in the controller memory. Further, the duration of each boosted and naturally aspirated operation may be recorded. Also, the level of boost and a level of vacuum during naturally aspirated engine operation which is proportional to the MAP may be recorded for each boosted and naturally aspirated operation event.

At 507, noise factors in the road segment may be identified. Noise factors may include fuel slosh, uneven road segment, potholes, changes in elevation, changes in fuel volatility, etc. Noise factors may be detrimental to successful completion of a diagnostic routine and cause erroneous results.

At 508, the routine includes determining if the identified road segment has completed (ended) and the vehicle is now being driven on a subsequent road segment in the drive cycle. If it is determined that the road segment is not completed and the vehicle is still travelling on the identified road segment, at 510, identifying boosted and naturally aspirated engine operation may be continued and the routine may return to step 506.

If it is determined that the road segment has completed, at 512, statistical parameters may be computed and updated for boosted operation in the completed road segment (RS(i)). Computing statistical parameters may include computing each of a number of boosted events ($BA\_K_{RS(i)}$) in the road segment, a mean ($BA\_Mu_{(RS(i))}$) of the boosted events, and a variance ($BA\_Var_{(RS(i))}$) of the boosted events in the road segment. As an example, the $BA\_K_{RS(i)}$ may provide an estimate of a number of times the engine is operated under boosted conditions while travelling on the road segment, the $BA\_Mu_{RS(i)}$ may provide an estimate of an average duration of boosted events, and $BA\_Var_{(RS(i))}$ may provide an estimate of spread of the durations of the boosted events from the mean value. Also, $BA\_Mu_{(RS(i))}$ may provide an estimate of an average level of boost pressure attained during a boosted event and $BA\_Var_{(RS(i))}$ may provide an estimate of spread of the level of boost pressure from the mean value.

Once the statistical parameters are calculated for a road segment, the previously estimated statistical parameters for the same road segment (RS(i)) may be updated based on the most recently estimated statistical parameters. The previously estimated statistical parameters are retrieved from the controller memory and updated based on the most recently estimated statistical parameters. The mean for boosted operation on the road segment RS(i) may be updated using equation 1.

$$BA\_Mu_{RS(i)}(t+1)=\alpha * BA\_Mu_{RS(i)}(t)+(1-\alpha)*BA\_Mu_{RS(i)} \qquad (1)$$

where $BA\_Mu_{RS(i)}(t+1)$ is the updated mean for boosted operation on the road segment RS(i), $\alpha$ is a pre-determined learning rate (as an example $\alpha$ may be 0.95), $BA\_Mu_{RS(i)}(t)$ may be the retrieved previously estimated mean for the road segment RS(i), and $BA\_Mu_{RS(i)}$ may be the most recently estimated mean for boosted operation on the road segment RS(i).

The variance for boosted operation on the road segment RS(i) may be updated using equation 2.

$$BA\_Var_{RS(i)}(t+1)=\alpha * BA\_Var_{RS(i)}(t)+(1-\alpha)*BA\_Var_{RS(i)} \qquad (2)$$

where $BA\_Var_{RS(i)}(t+1)$ is the updated variance for boosted operation on the road segment RS(i), $\alpha$ is a pre-determined learning rate (as an example $\alpha$ may be 0.95), $BA\_Var_{RS(i)}(t)$ may be the retrieved previously estimated variance for boosted operation on the road segment RS(i), and $BA\_Var_{RS(i)}$ may be the most recently estimated variance for boosted operation on the road segment RS(i).

The number of boosted events where the engine was operated under boosted conditions on the road segment RS(i) may be updated using equation 3.

$$BA\_K_{RS(i)}(t+1)=\alpha * BA\_K_{RS(i)}(t)+(1-\alpha)*BA\_K_{RS(i)} \qquad (2)$$

where $BA\_K_{RS(i)}(t+1)$ is the updated number of boosted events on the road segment RS(i), $\alpha$ is a pre-determined learning rate (as an example $\alpha$ may be 0.95), $BA\_K_{RS(i)}(t)$ may be the retrieved previously estimated number of boosted events for the road segment RS(i), and $BA\_K_{RS(i)}$ may be the most recently estimated number of boosted events for boosted operation on the road segment RS(i).

Similarly, at 514, statistical parameters may be computed and updated for naturally aspirated operation in the completed road segment (RS(i)). Computing statistical parameters may include computing each of a number of naturally aspirated events ($NA\_K_{RS(i)}$) in the road segment, a mean ($NA\_Mu_{RS(i)}$) of the naturally aspirated events, and a variance ($NA\_Var_{(RS(i))}$) of the naturally aspirated events in the road segment. As an example, the $BA\_K_{RS(i)}$ may provide an estimate of a number of times the engine is operated under naturally aspirated conditions while travelling in the road segment, the $NA\_Mu_{(RS(i))}$ may provide an estimate of an average duration of naturally aspirated events, and $NA\_Var_{(RS(i))}$ may provide an estimate of spread of the durations of the naturally aspirated events from the mean value. Also, $NA\_Mu_{(RS(i))}$ may provide an estimate of an average level of manifold vacuum attained during a naturally aspirated event and NA_Var$_{RS(i)}$ may provide an estimate of spread of the level of manifold vacuum from the mean value.

Once the statistical parameters for naturally aspirated operation are calculated for a road segment, the previously estimated statistical parameters for the same road segment (RS(i)) may be updated based on the most recently estimated statistical parameters. The previously estimated statistical parameters for naturally aspirated operation are retrieved from the controller memory and updated based on the most recently estimated statistical parameters. The mean for naturally aspirated operation on the road segment RS(i) may be updated using equation 4.

$$NA\_Mu_{RS(i)}(t+1) = \alpha * NA\_Mu_{RS(i)}(t) + (1-\alpha) * NA\_Mu_{RS(i)} \quad (4)$$

where NA_Mu$_{RS(i)}$(t+1) is the updated mean for naturally aspirated operation on the road segment RS(i), $\alpha$ is a pre-determined learning rate (as an example $\alpha$ may be 0.95), NA_Mu$_{RS(i)}$(t) may be the retrieved previously estimated mean for naturally aspirated operation on the road segment RS(i), and NA_Mu$_{RS(i)}$ may be the most recently estimated mean for naturally aspirated operation on the road segment RS(i).

The variance for naturally aspirated operation on the road segment RS(i) may be updated using equation 5.

$$NA\_Var_{RS(i)}(t+1) = \alpha * NA\_Var_{RS(i)}(t) + (1-\alpha) * NA\_Var_{RS(i)} \quad (5)$$

where NA_Var$_{RS(i)}$(t+1) is the updated variance for naturally aspirated operation on the road segment RS(i), $\alpha$ is a pre-determined learning rate (as an example $\alpha$ may be 0.95), NA_Var$_{RS(i)}$(t) may be the retrieved previously estimated variance for naturally aspirated operation on the road segment RS(i), and NA_Var$_{RS(i)}$ may be the most recently estimated variance for naturally aspirated operation on the road segment RS(i).

The number of naturally aspirated events where the engine was operated under naturally aspirated conditions on the road segment RS(i) may be updated using equation 6.

$$NA\_K_{RS(i)}(t+1) = \alpha * NA\_K_{RS(i)}(t) + (1-\alpha) * NA\_K_{RS(i)} \quad (6)$$

where NA_K$_{RS(i)}$ (t+1) is the updated number of naturally aspirated events on the road segment RS(i), $\alpha$ is a pre-determined learning rate (as an example $\alpha$ may be 0.95), NA_K$_{RS(i)}$ (t) may be the retrieved previously estimated number of naturally aspirated events for the road segment RS(i), and NA_K$_{RS(i)}$ may be the most recently estimated number of naturally aspirated events for boosted operation on the road segment RS(i).

At 516, the updated statistical parameters for the road segment RS(i) may be stored in the controller memory. The statistical parameters may include each of a number of boosted events and naturally aspirated event (BA_K$_{RS(i)}$ (t+1) and NA_K$_{RS(i)}$ (t+1)) in the road segment, a mean (BA_Mu$_{RS(i)}$(t+1) and NA_Mu$_{RS(i)}$(t+1)) of the boosted and naturally aspirated events, and a variance (BA_Var$_{RS(i)}$ (t+1) and NA_Var$_{RS(i)}$ (t+1)) of the boosted and naturally aspirated events in the road segment. If the road segment is being characterized for the first time, the most recently estimated statistical parameters (BA_K$_{RS(i)}$, NA_K$_{RS(i)}$, BA_Mu$_{RS(i)}$, NA_Mu$_{RS(i)}$, BA_Var$_{RS(i)}$, and BA_Var$_{RS(i)}$) for both boosted engine operation and naturally aspirated engine operation may be saved in the controller memory. Characteristics of each road segment in a drive cycle may be learned and saved in controller memory following the above mentioned steps.

Figure 6:
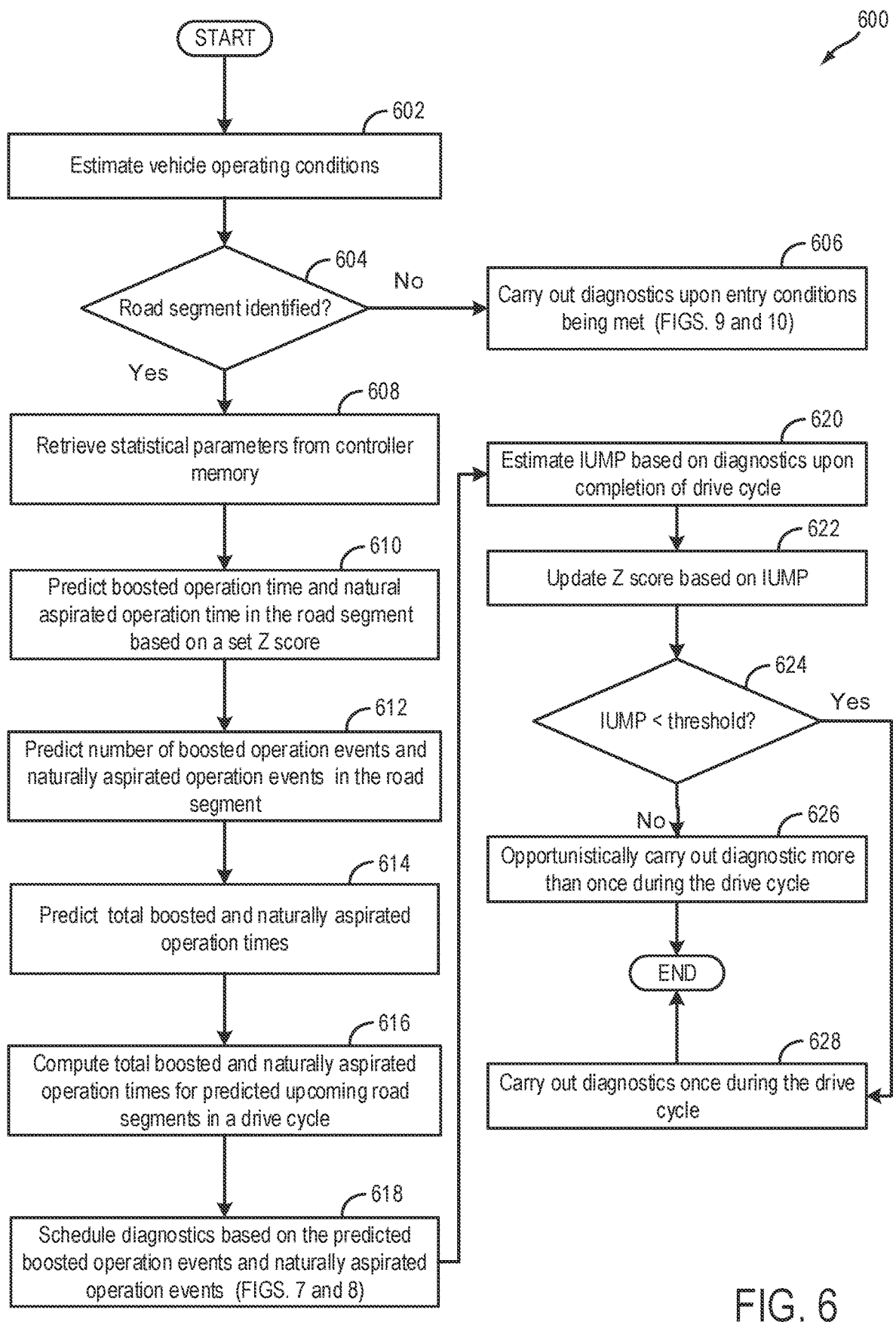
FIG. 6 shows a flowchart for an example method for previewing an upcoming road segment and scheduling diagnostic routines based on the preview.

FIG. 6 shows an example method 600 for previewing an upcoming road segment and scheduling diagnostic routines based on the preview. The preview may be based on statistical parameters for engine operation while the vehicle travels on the road segment as learned from previous travels on the same road segment. At 602, the routine includes estimating and/or measuring vehicle and engine operating conditions including vehicle speed, accelerator pedal position, engine speed, engine torque, engine temperature, exhaust turbine speed, intake compressor speed, manifold pressure, throttle opening, etc.

At 604, the routine includes determining if a road segment that the vehicle is travelling on can be identified. The controller may determine the GPS coordinates of the current road segment via one or more of an on-board navigation system, a network cloud and/or other vehicles or infrastructures via a wireless network. The controller may receive location information via vehicle-to-vehicle (V2V), vehicle-to-infrastructure-to-vehicle (V2I2V), and/or vehicle-to-infrastructure (V2I) technology. In one example, the controller may retrieve route information for the current drive cycle from an on-board navigation system. The operator may indicate the final destination for the drive cycle to the navigation system and follow a route suggested by the navigation system. In another example, for a frequently travelled road segment, the controller may identify the upcoming travel route for the drive cycle based on operator history such as if the operator travels a same route at a same time window at regular intervals of time (such as travelling from home to office at 8 am in the morning and travelling from office to home at 5 pm in the evening). In a further example, the controller may identify the upcoming travel route based on input to a smart device such as a smart phone from the operator.

The current location of the vehicle may be used to define a road segment that the vehicle is travelling on and then the controller may compare the current road segment to each road segment that is being previously characterized (such as via the method described in FIG. 5) to identify the road segment. If the current road segment is one of the previously characterized road segment then the controller may identify the current road segment with the unique identifier (RS(i)) previously assigned to the road segment.

If it is determined that the road segment cannot be identified, it may be inferred that the current road segment has not been characterized. In absence of characterization, engine operation along the road segment may not be optimally previewed and at 606, diagnostics of engine subsystems may be carried out upon entry conditions for each diagnostic routine being met. Examples of diagnostics of a vehicle fuel system and evaporative emissions system are discussed in FIGS. 9 and 10.

If it is determined that the road segment can be identified, at 608, the controller may retrieve statistical parameters from controller memory for the identified road segment. The statistical parameters may include each of a number of boosted events and naturally aspirated event (BA_K$_{RS(i)}$ and NA_K$_{RS(i)}$) in the road segment RS(i), a mean (BA_Mu$_{RS(i)}$ and NA_Mu$_{RS(i)}$) of the boosted and naturally aspirated events, and a variance (BA_Var$_{RS(i)}$ and NA_Var$_{RS(i)}$) of the boosted and naturally aspirated events in the road segment.

At 610, boosted operation time and naturally aspirated operation time per event may be predicted for the road segment based on a set variable (Z-score). Duration of boosted engine operation per boosted event may be estimated using equation 7.

$$BA_T = BA_{Mu_{RS(i)}}(t) + Z * (BA_{Var_{RS(i)}}(t+1))^{0.5Z} \quad (7)$$

where $BA_T$ is the duration of boosted engine operation per boosted event, $BA_{Mu_{RS(i)}}(t)$ is a mean for boosted engine operation on the road segment RS(i) at a time t as learned during a previous vehicle travel on the road segment RS(i) and retrieved from the controller memory, $BA_{Var_{RS(i)}}(t+1)$ is a variance for boosted engine operation on the road segment RS(i) at a time t+1 as learned during another previous vehicle travel on the road segment RS(i) and retrieved from the controller memory, and z is the Z-score that is set between −5 and 5. Z-score allows the prediction to be shifted up or down from the mean to reach an optimal prediction.

The Z-score may be set to a value and then adjusted periodically such as once a week based on estimated IUMP for diagnostic routines. In one example, when the Z-score is set to a higher value (such as 5), the value of $BA_T$ will be shifted higher which gives an optimistic view of completion of a diagnostic routine and when Z-score is set to a lower value (such as −3), the value of $BA_T$ will be shifted lower which gives a pessimistic view of completion of a diagnostic routine. Details of adjustments to the Z-score will be discussed later in this method.

Duration of naturally aspirated engine operation per naturally aspirated event may be estimated using equation 8.

$$NA_T = NA_{Mu_{RS(i)}}(t) + Z^*(NA_{Var_{RS(i)}}(t+1))^{0.5Z} \quad (8)$$

where $NA_T$ is the is the duration of naturally aspirated engine operation per boosted event, $NA_{Mu_{RS(i)}}(t)$ is a mean for naturally aspirated engine operation on the road segment RS(i) at a time t as learned during a previous vehicle travel on the road segment RS(i) and retrieved from the controller memory, $NA_{Var_{RS(i)}}(t+1)$ is a variance for naturally aspirated engine operation on the road segment RS(i) at a time t+1 as learned during another previous vehicle travel on the road segment RS(i) and retrieved from the controller memory, and z is the Z-score that is set between −5 and 5.

At 612, a number of boosted events (during which the engine is operated with boost pressure) and a number of naturally aspirated operation events (during which the engine is operated with intake manifold vacuum) may be predicted for the road segment based on a set variable (Z-score). A number of boosted events ($BA\_K_{RS(i)}$) during travel on the road segment RS(i) may be predicted based on a learned number of boosted events during previous travels on the route that were characterized. Similarly, a number of naturally aspirated events ($NA\_K_{RS(i)}$) during travel on the road segment RS(i) may be predicted based on a learned number of naturally aspirated events during previous travels on the route that were characterized.

At 614, a total duration of engine operation under boosted conditions and a total duration of engine operation under naturally aspirated conditions during travel on the road segment RS(i) in the drive cycle may be computed. A first total duration of boosted engine operation may be given by equation 9.

$$BA_{Total} = BA\_K_{RS(i)} * BA\_T \quad (9)$$

where $BA_{Total}$ is the total duration of engine operation under boosted conditions, $BA\_K_{RS(i)}$ is the number of boosted events during travel on the road segment, and BA_T is the duration of boosted engine operation per boosted event. A second total duration of naturally aspirated engine operation may be given by equation 10.

$$NA_{Total} = NA\_K_{RS(i)} * NA\_T \quad (10)$$

where $NA_{Total}$ is the total duration of engine operation under boosted conditions, $NA\_K_{RS(i)}$ is the number of boosted events during travel on the road segment, and NA_T is the duration of boosted engine operation per boosted event.

Based on the computed statistical parameters, the controller may further predict the timing of boosted events along the road segment, the duration of each boosted event, and a level of boost that may be available during each future boosted event. Similarly, based on the computed statistical parameters, the controller may further predict the timing of each naturally aspirated event along the road segment, the duration of each naturally aspirated event, and a level of intake manifold vacuum that may be available during each future naturally aspirated event.

In one example, as discussed in step 604, if the controller is able to predict and identify upcoming road segments during the drive cycle, steps 608-616 may be repeated for each road segment. The controller may retrieve statistical parameters from controller memory for each upcoming identified road segment, predict boosted operation time and naturally aspirated operation time per event for each upcoming identified road segment, predict a number of boosted events and a number of naturally aspirated operation events for each upcoming identified road segment, and compute a total duration of engine operation under boosted conditions and a total duration of engine operation under naturally aspirated conditions during travel on each upcoming identified road segment. In this way, the controller may be able to preview the entire drive cycle.

At 618, one or more diagnostics for engine sub-systems may be scheduled during the drive cycle based on the predicted boosted engine operation events and naturally aspirated. The preview for the road segment that the vehicle is travelling on and upcoming road segments may allow prediction of favorable windows during which the possibility of completion of a diagnostic routine is the highest. An example scheduling of a diagnostic routine to be carried out during boosted engine operation is elaborated in FIG. 7 and an example scheduling of a diagnostic routine to be carried out during naturally aspirated engine operation is elaborated in FIG. 8.

Upon completion of a drive cycle, distinct in-use monitor performance (IUMP) rates for diagnostics of each engine sub-system may be estimated. IUMP may be defined as a ratio of a number of time a diagnostic routine has been executed and completed (numerator) to a number of drive cycles for the vehicle (denominator). Therefore, if a diagnostic routine may not be completed within a drive cycle, the denominator of IUMP may increase by one at the end of the drive cycle while the numerator may remain the same. In order to maintain a high IUMP and meet regulatory requirements, it is desired to be able to successfully carry out diagnostics at least once during a drive cycle such that both the numerator and the denominator may both be incremented. Distinct IUMPs may be estimated for each diagnostic routine that is carried out during the drive cycle. As an example, in the United States, according to federal regulations, a leak monitor for an EVAP system may have a minimum IUMP of 0.52. A lower than 0.52 IUMP may result in non-conformance and even recall of the vehicle.

At 622, Z score for preview of a road segment based on statistical parameters may be updated based on the estimated IUMP for a diagnostic routine. A higher Z score provides an optimistic estimate of completion of the diagnostic routine during the drive cycle and a lower Z score provides a pessimistic estimate of completion of the diagnostic routine during the drive cycle. If the Z score is higher, the diagnostic routine may be scheduled to be carried out at a more favorable window even if that is not the first available window where entry conditions are met for the diagnostic routine. If the Z score is higher, the diagnostic routine may be scheduled to be carried out at the first available window where entry conditions are met for the diagnostic routine even if that is not the most favorable window during the drive cycle. Z scores may differ between operators based on their driving habits. Also, Z scores may be based on road characteristics of the road segments. The Z score may be updated on a weekly basis based on the IUMP. As an example, the initial Z score may be set at a higher value such as closer to 5.

If it is determined that the IUMP is lower than a first threshold value (such as below 80% of the minimum IUMP for the diagnostic routine as set by a regulatory agency), the Z-score may be decreased by 0.1 to decrease the optimism in the scheduling the diagnostic routine. By decreasing the Z score, favorable windows (segments) may be identified while windows with a lower probability of completion of the diagnostic routine may be excluded from the scheduling. Over time, the IUMP may plateau at a maximum value which might be different for different operators and this value may change with changes in drive cycles.

If it is determined that after plateauing, the IUMP is decreasing again, the Z score may be increased by 0.1 to increase the optimism in the scheduling the diagnostic routine. In this way, the Z score may be incrementally adjusted to increase IUMP and maintain IUMP above the minimum IUMP for the diagnostic routine as set by a regulatory agency.

In one example, according to US federal regulations, a leak monitor for an EVAP system may have a minimum IUMP of 0.52. A Z score for scheduling diagnostics of the EVAP system may be initially set of 5 and the IUMP for the diagnostics of the EVAP system may be monitored. If it is determined that the IUMP for the diagnostics of the EVAP system is 0.42 which is below the minimum IUMP (non-conformance), the Z score may be decreased to 3.7 to increase the number of windows available for scheduling the diagnostics of the EVAP system. At a Z score of 3.7, the IUMP may improve to 0.46 which is still lower than the minimum IUMP. The Z score may then be further dropped to 2.3 to further increase the opportunity for completion of the diagnostic routine. Upon dropping the Z score, the IUMP may be estimated to increase to 0.55 which is higher than the minimum IUMP. The Z score may be maintained between 1.9 and 2.5 where the peak IUMP is recorded to be 0.57. When the Z score is set to be smaller than 1.9, the IUMP may start decreasing.

At 624, the routine includes determining if the IUMP for a diagnostic routine of an engine sub-system is lower than a second threshold. In one example, the second threshold may correspond to the minimum IUMP for the diagnostic routine as set by a regulatory agency. If it is determined that the IUMP is lower than the second threshold, in order to increase the chance of improving the IUMP, at 626, the diagnostic routine may be opportunistically carried out more than once during the drive cycle. In a drive cycle, the denominator of the IUMP may be incremented once but upon successful completion of a diagnostic routine, the numerator may be increased more than once to increase the IUMP. If more than one favorable window is previewed in a drive cycle, the diagnostic routine may be scheduled to be carried out each time the favorable window is available and all entry conditions are met. This way, by bolstering IUMP, during future situations when during one or more drive cycles diagnostic routine may not be carried out due to conditions such as road work which limits opportunities for boosted operation and cruising at constant speed, the IUMP may not decrease below the minimum set by a regulatory agency. In this way, it is possible to attain a 2:1, 3:1, 4:1, etc. ratio in a drive cycle.

In one example, if the controller learns from an external server (such as department of transport data cloud) that construction on a learned (characterized) route will take place in one month and last for three months, even if the IUMP is higher than the second threshold, the diagnostic routine may be scheduled to be carried out more than once during a drive cycle to preemptively increase IUMP as credit for the duration during which it might not be able to complete the diagnostic routine during each drive cycle.

If it is determined that the IUMP is higher than the second threshold, the routine may proceed to step 628, the controller may carry out the diagnostic routine once during the drive cycle such that both the numerator and the denominator of the IUMP is updated by one.

Figure 7:
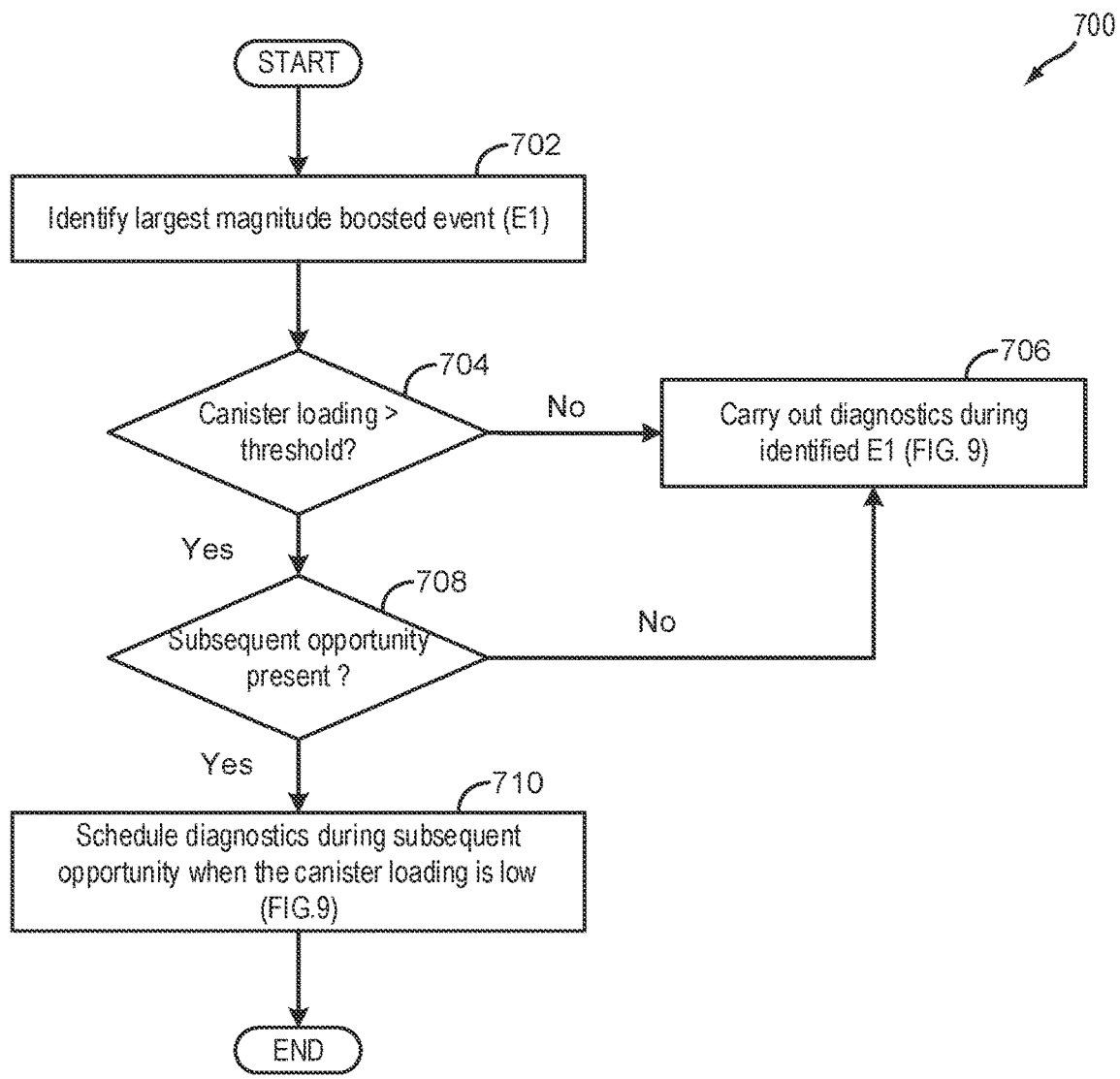
FIG. 7 shows a flowchart for an example method for scheduling a diagnostic routine to be carried out during boosted engine operation.

FIG. 7 shows a first example method 700 for scheduling a diagnostic routine to be carried out during boosted engine operation. The diagnostic routine may be scheduled based on a preview of the road segment estimated on learned characteristics of the road. Method 700 may be part of method 600 and may be carried out at step 618 of method 600 in FIG. 6. The diagnostic routine in this example may be carried out only under boosted engine operation when the intake manifold pressure is higher than the barometric pressure. In this example, scheduling of a diagnostic routine for the on-board EVAP system is considered. However, in alternate examples, diagnostic routines for other engine sub-systems may be similarly scheduled based on parameters relevant for the specific diagnostic routine.

At 702, an upcoming boosted event, E1, (where the engine is being operated under boost pressure) with a highest predicted boost pressure may be identified for the current drive cycle based on statistical parameters previously learned for the drive cycle. The preview of the road segment may provide an estimate of a number of boosted events and the level of boost (higher pressure in the engine intake manifold) that would be attained at each boosted event. As an example, for a diagnostic routine for the EVAP system, a higher boost pressure may allow the routine to be completed within a shorter duration following which purge of the EVAP system canister (such as fuel vapor canister 104 in FIG. 1) may be resumed. Also, the duration of the predicted largest magnitude boosted event E1 would be sufficient for completion of the diagnostic event. As an example, noise factors such as bumpy road conditions and fuel sloshes may not be present during the identified segment E1 such that the diagnostic routine may be completed without interruption.

At 704, the routine includes determining if loading in an EVAP system canister load is higher than a threshold load. In one example, the canister load is inferred based on feedback from a canister sensor, such as a pressure sensor, a hydrocarbon sensor, etc. In another example, the canister load is inferred based on engine operating conditions such as a duration of engine operation since a last purging of the canister, and an average engine load and combustion air-fuel ratio over the duration. Further still, besides the HC sensor and pressure sensor, a temperature sensor embedded in the carbon bed may also be used to estimate the canister loading state. The threshold load may correspond to a load below which there would not be an increase in undesired emissions while carrying out the diagnostic routine. As an example, during the diagnostic routine, purging of the canister is disabled and if the canister is loaded above the threshold loading while the diagnostic routine is being carried out, the possibility of fuel vapors from being desorbed from the canister may increase.

If it is determined that the canister loading is lower than the threshold loading, at 706, diagnostics of the evaporative emissions control system may be carried out during the identified boosted event E1 when the boost pressure is highest with lower noise factors during the event allowing for efficient completion of the diagnostic routine. An example diagnostic routine of an EVAP system to be carried out during boosted engine operation is elaborated in FIG. 9.

However, if it is determined that the canister loading is higher than the threshold load, at 708, the routine includes determining if a subsequent opportunity is present during the drive cycle for carrying out the diagnostics routine. The subsequent opportunity may be favorable for completion of the diagnostic routine without interruptions due to noise factors. If a subsequent opportunity is available, it is possible to purge the canister and empty its contents to the engine cylinders for combustion (before the subsequent opportunity) and then to carry out the diagnostic routine with a lower than threshold canister load.

If it is determined that a subsequent opportunity for successfully carrying out the diagnostic routine cannot be previewed, the routine may proceed to step 706 and the diagnostic routine may be carried out during the first identified largest boosted event (E1). The controller may opportunistically at least partially purge the canister prior to initiation of the diagnostic routine.

If it is determined that during a higher than threshold canister loading, a subsequent opportunity is present for successful completion of the diagnostic routine, at 710, the diagnostic routine may be scheduled during the subsequent opportunity when the canister loading is lower than the threshold loading. An example diagnostic routine of the EVAP system to be carried out during boosted engine operation is elaborated in FIG. 9. By ensuring that the diagnostic routine would be carried out at least once during a drive cycle, the LUMP ratio may be improved and compliance with regulations may be maintained.

Figure 8:
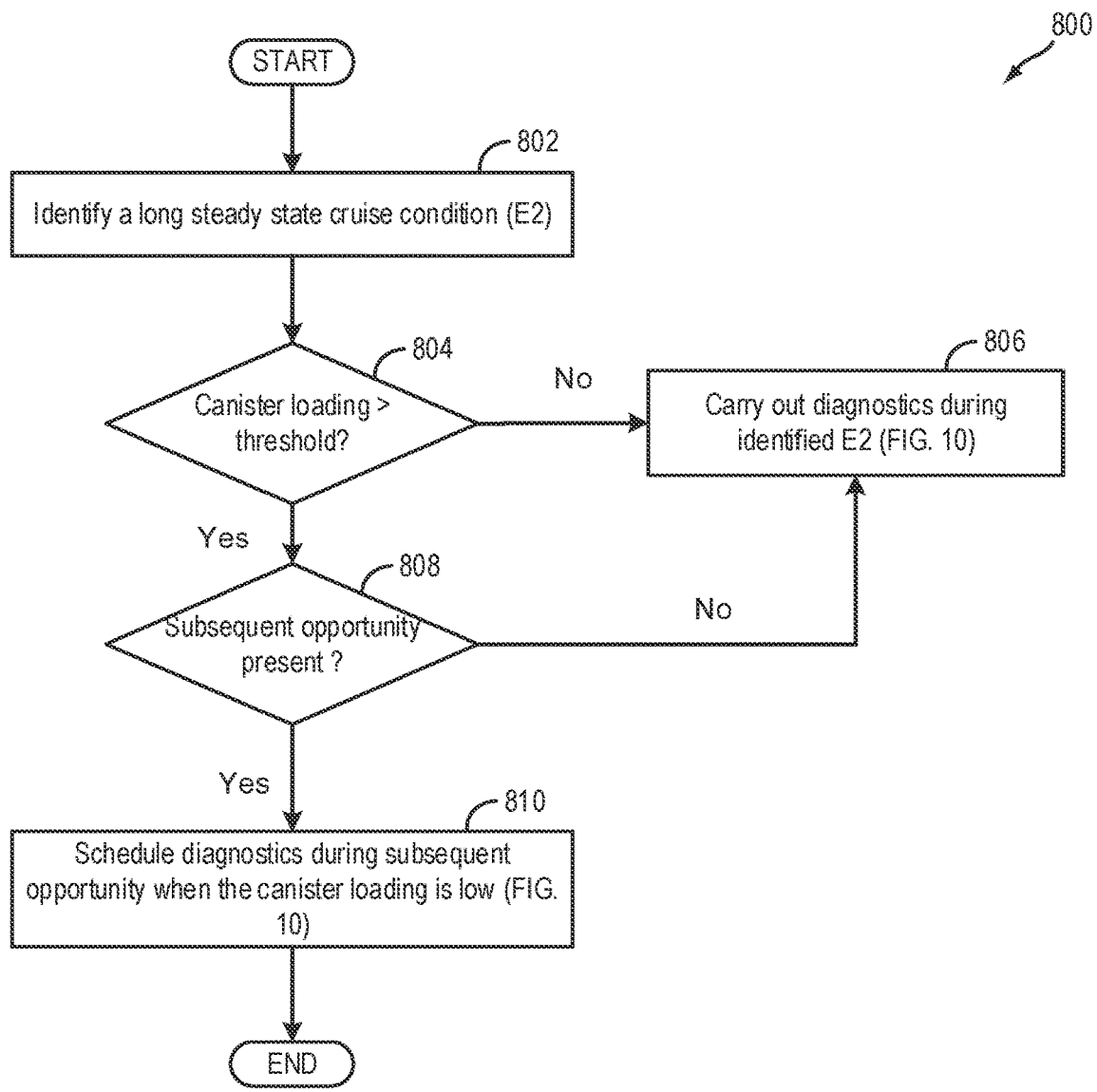
FIG. 8 shows a flowchart for an example method for scheduling a diagnostic routine to be carried out during naturally aspirated engine operation.

FIG. 8 shows a second example method 800 for scheduling a diagnostic routine to be carried out during naturally aspirated engine operation. The diagnostic routine may be scheduled based on a preview of the road segment estimated on learned characteristics of the road. Method 800 may be part of method 600 and may be carried out at step 618 of method 600 in FIG. 6. The diagnostic routine in this example may be carried out only under naturally aspirated engine operation when the intake manifold pressure is lower than the barometric pressure. In this example, scheduling of a diagnostic routine for the on-board EVAP system is considered. However, in alternate examples, diagnostic routines for other engine sub-systems may be similarly scheduled based on parameters relevant for the specific diagnostic routine.

At 802, an upcoming naturally aspirated event, E2, (where the engine is being operated with intake manifold vacuum) with a longer steady state cruise conditions may be identified for the current drive cycle based on statistical parameters previously learned for the drive cycle. The steady state cruise conditions may include the engine operating within a speed range (such as within 10% of the engine idling speed) without significant accelerations. The preview of the road segment may provide an estimate of a number of naturally aspirated events and the length of each event. As an example, for a diagnostic routine for the EVAP system, a steady engine cruise condition may allow the routine to be completed within a shorter duration following which purge of the EVAP system canister (such as fuel vapor canister 104 in FIG. 1) may be resumed. Also, the duration of the predicted event E2 would be sufficient for completion of the diagnostic event. As an example, noise factors such as bumpy road conditions, fuel sloshes may not be present during the identified segment E2 such that the diagnostic routine may be completed without interruption.

At 804, the routine includes determining if loading in an EVAP system canister load is higher than a threshold load. In one example, the canister load is inferred based on feedback from a canister sensor, such as a pressure sensor, a hydrocarbon sensor, etc. In another example, the canister load is inferred based on engine operating conditions such as a duration of engine operation since a last purging of the canister, and an average engine load and combustion air-fuel ratio over the duration. Further still, besides the HC sensor and pressure sensor, a temperature sensor embedded in the carbon bed may also be used to estimate the canister loading state. The threshold load may correspond to a load below which there would not be an increase in undesired emissions while carrying out the diagnostic routine. As an example, during the diagnostic routine, purging of the canister is disabled and if the canister is loaded above the threshold loading while the diagnostic routine is being carried out, the possibility of fuel vapors from being desorbed from the canister may increase.

If it is determined that the canister loading is lower than the threshold loading, at 806, diagnostics of the evaporative emissions control system may be carried out during the identified naturally aspirated event E2 with a longer steady state cruise condition and lower noise factors during the event allowing for efficient completion of the diagnostic routine. An example diagnostic routine of an EVAP system to be carried out during naturally aspirated engine operation is elaborated in FIG. 10.

However, if it is determined that the canister loading is higher than the threshold load, at 808, the routine includes determining if a subsequent opportunity is present during the drive cycle for carrying out the diagnostics routine. The subsequent opportunity may include a longer steady state cruise condition and be favorable for completion of the diagnostic routine without interruptions due to noise factors. If a subsequent opportunity is available, it is possible to purge the canister and empty its contents to the engine cylinders for combustion (before the subsequent opportunity) and then to carry out the diagnostic routine with a lower than threshold canister load.

If it is determined that a subsequent opportunity for successfully carrying out the diagnostic routine cannot be previewed, the routine may proceed to step 806 and the diagnostic routine may be carried out during the first identified longer steady state cruise event (E2). The controller may opportunistically at least partially purge the canister prior to initiation of the diagnostic routine.

If it is determined that during a higher than threshold canister loading, a subsequent opportunity is present for successful completion of the diagnostic routine, at 810, the diagnostic routine may be scheduled during the subsequent opportunity when the canister loading is lower than the threshold loading. An example diagnostic routine of the EVAP system to be carried out during naturally aspirated engine operation is elaborated in FIG. 10. By ensuring that the diagnostic routine would be carried out at least once during a drive cycle, the LUMP ratio may be improved and compliance with regulations may be maintained.

Turning to FIG. 9, a flow chart for a high level example method 900 for performing an evaporative emissions test diagnostic procedure on an evaporative emissions control system (e.g., 154) and fuel system (e.g., 106), is shown. More specifically, method 900 may be used to conduct an evaporative emissions test diagnostic procedure responsive to an indication that conditions are met for an evaporative emissions test under boost conditions. As described in FIGS. 6-7, the timing for carrying out the method 900 may be predicted upon onset of a drive cycle based on characteristics of the road segment. Conducting such an evaporative emissions test diagnostic procedure may include the evaporative emission system and fuel system being coupled to a compressor inlet through an orifice having an inlet pressure reduced by a venturing effect, thus enabling evacuation of the fuel system and evaporative emissions system under boost conditions. By conducting the evaporative emissions test under boost conditions, an absence of undesired evaporative emissions and an indication that a second check valve (CV2) (e.g., 170) is not stuck closed may be conclusively indicated responsive to a threshold vacuum being reached during conducting the evaporative emissions test diagnostic. Furthermore, if, while conducting the evaporative emissions test under boost conditions, positive pressure in the fuel system and evaporative emissions system is indicated, then it may be indicated that the first check valve (CV1) (e.g. 153) is stuck in an open configuration. Still further, responsive to an indication that the threshold vacuum is not reached during conducting the evaporative emissions test diagnostic, it may be indicated that either gross undesired emissions are present, or that CV2 is stuck closed. Whether the threshold vacuum is indicated to be reached or not, the results of the evaporative emissions test diagnostic procedure may be stored at the controller, as discussed in further detail below.

At 902, and may include estimating and/or measuring vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Continuing at 904, the routine may include indicating whether conditions for an evaporative emissions test under boost are met. As an example, the evaporative emissions test may be initiated at the time scheduled for initiation of the diagnostic routine, as determined in method 700 in FIG. 7. In another example, conditions for the evaporative emissions test may include an indication of manifold air pressure (MAP) greater than barometric pressure (BP) by a predetermined threshold amount. In some examples, conditions being met may include MAP greater than BP by a predetermined threshold for a predetermined time duration. Conditions being met may in some examples further include an indication that a fuel vapor canister purge event is not in progress. Still further, conditions being met may in some examples include no prior indication of undesired evaporative emissions in the fuel system and/or evaporative emissions system, and no prior indication of CV2 (e.g., 170) being stuck closed.

If, at 904, conditions for an evaporative emissions test diagnostic procedure under boost are not indicated to be met, the method may proceed to 906. At 906, method 900 may include maintaining current vehicle operating status. For example, at 906, the CPV may be maintained in its current configuration, the FTIV may be maintained in its current configuration, and the ELCM COV may be maintained in its current configuration. Furthermore, other engine system actuators such as throttle, fuel injectors, etc., may be maintained in their current status. Method 900 may then end.

Returning to 904, if it is indicated that conditions for an evaporative emissions test diagnostic procedure are met, at 908, method 900 may include commanding (e.g. actuating) the ELCM COV to the second position. Such a configuration is depicted above with regard to FIGS. 3B and 3D. However, it may be understood that the ELCM pump (e.g. 330) may be maintained off. Furthermore, the FTIV may be commanded open (e.g. actuated open) to fluidically couple the fuel system to the evaporative emissions system. In some examples the FTIV may be maintained closed at 720, such that only the evaporative emissions system may be diagnosed for the presence or absence of undesired evaporative emissions, without departing from the scope of this disclosure. In such an example, the ELCM pressure sensor (e.g. 296) may be utilized to monitor pressure in the evaporative emissions system, as discussed above at FIG. 6. Proceeding to 910, method 700 may include commanding open (actuating open) the CPV. By commanding the ELCM COV to the second position, and commanding open the CPV, vacuum derived from the ejector (e.g., 140) under boost conditions may be applied to the evaporative emissions system (e.g., 154) and fuel system (e.g., 106). More specifically, by commanding the ELCM COV to the second position at step 908, the evaporative emissions system and fuel system may be sealed from atmosphere. By commanding open the CPV at 910, vacuum derived from the ejector may be applied to the sealed evaporative emissions system and fuel system (or in some examples just the evaporative emissions system under conditions where the FTIV is maintained closed).

However, in a case where CV1 is stuck open, rather than negative pressure (e.g. vacuum) being indicated in the fuel system and evaporative emissions system, instead, a positive pressure with respect to atmospheric pressure may be indicated. More specifically, in the case of a stuck open CV1, positive pressure in the intake manifold may be communicated to the fuel system and evaporative emissions system. Accordingly, if positive pressure is indicated, then it may be determined that the CV1 is stuck open.

Thus, proceeding to 912, method 900 may include monitoring pressure in the evaporative emissions system and fuel system. For example, monitoring for a positive pressure build or vacuum build (e.g., negative pressure with respect to atmospheric pressure) may include monitoring pressure via a pressure sensor (e.g., 107), positioned in the fuel system and/or evaporative emissions system. Monitoring pressure in the fuel system and evaporative emissions system may be conducted for a predetermined time duration, in some examples.

Proceeding to 914, method 900 may include indicating whether a positive pressure build in the fuel system and evaporative emissions system is greater than a predetermined positive pressure threshold. If, at 914, positive pressure greater than the positive pressure threshold is indicated, method 900 may proceed to 914, and may include indicating that the CV1 is in a stuck open configuration. Proceeding to 930, the result may be stored at the controller, for example. Furthermore, a malfunction indicator light (MIL) may be illuminated on the vehicle dash to alert the vehicle operator of the need to service the vehicle. Method 900 may then proceed to 928, and may include commanding closed the CPV, and configuring the ELCM COV in the first position such that the fuel system and evaporative emissions system may be coupled to atmosphere. Responsive to an indication that pressure in the fuel system and evaporative emissions system has returned to atmospheric pressure, the FTIV may be commanded closed to seal the fuel system. Method 700 may then end.

Returning to 914, responsive to an absence of an indication of a positive pressure build in the fuel system and evaporative emissions system, method 900 may proceed to 918, and may include indicating whether a vacuum build as monitored by the pressure sensor during evacuating the evaporative emissions system and fuel system is greater than a predetermined vacuum build threshold. The predetermined threshold may in some examples be a function of atmospheric pressure. For example, the predetermined threshold may comprise a decreased vacuum level responsive to decreasing barometric pressure, and increased vacuum level responsive to increasing barometric pressure.

At 918, if it is indicated that vacuum build in the fuel system and evaporative emissions system has reached the predetermined threshold, method 000 may proceed to 920. At 920, method 900 may further include indicating that CV2 (e.g., 170) is not stuck closed. If CV2 were stuck closed, then the pressure sensor (e.g., 107) would not have registered a change in pressure during evacuating the fuel system and evaporative emissions system. Furthermore, at 920, it may be indicated that there are no gross undesired evaporative emissions stemming from the fuel system and/or evaporative emissions system.

Proceeding to 922, the CPV may be closed to isolate the fuel system and evaporative emissions system from atmosphere and from engine intake, and monitoring a pressure bleed-up in the fuel system and evaporative emissions system. Again, pressure may be monitored by a pressure sensor (e.g., 107). Pressure may be monitored for a predetermined duration, in some examples. If pressure in the fuel system and evaporative emissions system reaches a predetermined threshold pressure, or if a rate of pressure bleed-up exceeds a predetermined pressure bleed-up rate, then non-gross undesired evaporative emissions may be indicated. However, if, during the predetermined duration, pressure does not reach the predetermined threshold pressure, or if the rate of pressure bleed-up does not exceed the predetermined pressure bleed-up rate, then it may be indicated that non-gross undesired evaporative emissions are not present. As such, step 922 comprises testing for presence or absence of non-gross undesired evaporative emissions by comparing a pressure change in the fuel system or evaporative emission system to a reference pressure change after evacuating the fuel system and evaporative emissions system.

Proceeding to step 926, the results of the evaporative emissions test diagnostic procedure may be stored at the controller. Continuing to 928, method 900 may include maintaining closed the CPV, and commanding the ELCM COV to the first position. By maintaining closed the CPV, the fuel system and evaporative emissions system may be sealed from engine intake (and from the ejector). Furthermore, by commanding the ELCM COV to the first position, pressure in the fuel system and evaporative emissions system may be relieved. Responsive to pressure in the fuel system and evaporative emissions system reaching atmospheric pressure, the FTIV may be commanded (e.g. actuated) closed. Method 900 may then end.

Returning to 918, if it is indicated that vacuum build in the fuel system and evaporative emissions system did not reach the predetermined threshold vacuum, method 900 may proceed to 924. At 924, method 900 may include indicating that either CV2 is stuck closed, or that gross undesired evaporative emissions are present in the fuel system and evaporative emissions system. In other words, the vacuum build may have been prevented from reaching the predetermined vacuum threshold due to the CV2 being stuck closed, or due to gross undesired evaporative emissions. Accordingly, a conclusive determination as to the source of the failure to reach the predetermined threshold vacuum may not be indicated at 924. Instead, method 900 may proceed to 926. At 926, method 900 may include storing the results of the evaporative emissions test diagnostic at the controller.

Continuing to 928, method 900 may include commanding closed the CPV, and commanding the ELCM COV to the first position. As described above, by commanding closed the CPV, the fuel system and evaporative emissions system may be sealed from engine intake (and from the ejector). Furthermore, by commanding the ELCM COV to the first position, pressure in the fuel system and evaporative emissions system may be relieved. Responsive to pressure in the fuel system and evaporative emissions system reaching atmospheric pressure, the FTIV may be commanded closed. Method 900 may then end.

Turning now to FIG. 10, a flow chart for a high level example method 1000 for performing an evaporative emissions test diagnostic procedure on an evaporative emissions control system (e.g., 154) and fuel system (e.g., 106), is shown. More specifically, method 600 may be used to conduct an evaporative emissions test diagnostic procedure responsive to an indication that conditions are met for an evaporative emissions test under natural aspiration (intake manifold vacuum) conditions. In this way, by conducting the evaporative emissions test under natural aspiration conditions, an absence of undesired evaporative emissions and an indication that a first check valve (CV1) (e.g., 153) is not stuck closed may be conclusively indicated responsive to a threshold vacuum being reached during conducting the evaporative emissions test diagnostic. Furthermore, responsive to an indication that the threshold vacuum is not reached during conducting the evaporative emissions test diagnostic, it may be indicated that either gross undesired emissions are present, or that CV1 is stuck closed. Whether the threshold vacuum is indicated to be reached or not, the results of the evaporative emissions test diagnostic procedure may be stored at the controller, as discussed in further detail below.

Method 1000 will be described with reference to the systems described herein and shown in FIGS. 1-3D, though it should be understood that similar methods may be applied to other systems without departing from the scope of this disclosure. More specifically, method 1000 may be used to conduct an evaporative emissions test diagnostic procedure responsive to an indication that conditions are met for an evaporative emissions test under naturally aspirated conditions. As described in FIGS. 6-7, the timing for carrying out the method 1000 may be predicted upon onset of a drive cycle based on characteristics of the road segment. The controller may employ fuel system and evaporative emissions system actuators, such as canister purge valve (CPV) (e.g., 158), ELCM changeover valve (COV) (e.g. 315), fuel tank isolation valve (FTIV) (e.g. 191), etc., according to the method below.

At 1002, vehicle operating conditions may be estimated and/or measured. Operating conditions may be estimated, measured, and/or inferred, and may include one or more vehicle conditions, such as vehicle speed, vehicle location, etc., various engine conditions, such as engine status, engine load, engine speed, A/F ratio, manifold air pressure, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

At 1004, the routine included determining whether conditions for an evaporative emissions test under natural aspiration (intake manifold vacuum) are met. As an example, the evaporative emissions test may be initiated at the time scheduled for initiation of the diagnostic routine, as determined in method 700 in FIG. 7. In another example, conditions for the evaporative emissions test may include an indication of manifold air pressure (MAP) greater than barometric pressure (BP) by a predetermined threshold amount. Conditions for an evaporative emissions test under natural aspiration may include an indication of manifold air pressure (MAP) less than barometric pressure (BP) by a predetermined threshold amount. In some examples, conditions being met may include MAP being less than BP by the predetermined threshold amount for a predetermined time duration. Conditions being met may in some examples further include an indication that an evaporative emission test diagnostic on the evaporative emissions control system and fuel system under natural aspiration conditions has not already been conducted during the current drive cycle. Conditions being met may in some examples further include an indication that a purge event is not in progress. Still further, conditions being met may in some examples include no prior indication of undesired evaporative emissions in the evaporative emissions system and fuel system, and no prior indication of CV1 (e.g., 153) being stuck closed.

If, at 1004, conditions for an evaporative emissions test diagnostic procedure under natural aspiration are not indicated to be met, method 1000 may proceed to 1005. At 1005, method 1000 may include maintaining current vehicle operating status. For example, at 1005, the CPV may be maintained in its current configuration, the ELCM COV may be maintained in its current configuration, the FTIV may be maintained in its current configuration, etc. Furthermore, other engine system actuators such as throttle, fuel injectors, etc., may be maintained in their current status. Method 1000 may then end.

Returning to 1004, if it is indicated that conditions for an evaporative emissions test diagnostic procedure are met, method 1000 may proceed to 1006. At 1006, the ELCM COV may be commanded to the second position. More specifically, a signal may be sent from the controller actuating the ELCM COV to the second position. For example, the ELCM COV in the second position is illustrated at FIG. 3B and FIG. 3D. Furthermore, the ELCM pump (e.g. 330) may be maintained off. The FTIV may be commanded to an open (e.g. actuating open) position. With the ELCM COV configured in the second position with the ELCM pump off, and the FTIV open, it may be understood that the fuel system and evaporative emissions system may be sealed from atmosphere. While the FTIV is indicated to be commanded open, in other examples, it may be understood that the FTIV may be maintained closed. For example, only the evaporative emissions system may be diagnosed for undesired evaporative emissions responsive to the FTIV being maintained closed. In such an example, rather than relying on the fuel tank pressure transducer (FTPT) (e.g. 107), the ELCM pressure sensor (e.g. 296) may be utilized to monitor pressure in the evaporative emissions system. The FTIV may be maintained closed without departing from the scope of the present disclosure.

Proceeding to 1008, the CPV may be commanded open (e.g. actuating open). More specifically, the vehicle controller (e.g. 166) may send a signal to actuate open the CPV. By commanding the ELCM COV to the second position with the FTIV open, and commanding open the CPV, vacuum derived from the intake manifold under natural aspiration conditions may be applied to the evaporative emissions system (e.g., 154) and fuel system (e.g., 106). More specifically, by commanding the ELCM COV to the second position, the evaporative emissions system and fuel system may be sealed from atmosphere. By commanding open the CPV, vacuum derived from the intake manifold may be applied to the sealed fuel system and evaporative emissions system.

Proceeding to 1010, vacuum build in the fuel system and evaporative emissions system (or in some examples just the evaporative emissions system if the FTIV is maintained closed) may be monitored. For example, as discussed above, monitoring vacuum build (e.g., negative pressure with respect to atmospheric pressure) may include monitoring pressure via a pressure sensor (e.g., 107) (or via the ELCM pressure sensor under conditions where the FTIV is maintained closed), positioned in the fuel system and/or evaporative emissions system. Monitoring vacuum build may be conducted for a predetermined time duration, in some examples.

Proceeding to 1012, the routine includes determining whether vacuum build as monitored by the pressure sensor during evacuating the fuel system and evaporative emissions system is greater than a predetermined threshold. The predetermined threshold may be in some examples be a function of atmospheric pressure. For example, the predetermined threshold may comprise a decreased vacuum level responsive to decreasing barometric pressure, and increased vacuum level responsive to increasing barometric pressure.

If it is indicated that vacuum build in the fuel system and evaporative emissions system (or just the evaporative emissions system under conditions where the FTIV is maintained closed) has reached the predetermined threshold, at 1016, method 1000 may include indicating that CV1 (e.g., 153) is not stuck closed or substantially closed. If CV1 were stuck closed, then the pressure sensor (e.g., 107) would not have registered a change in pressure during evacuating the fuel system and evaporative emissions system. Furthermore, it may be indicated that there are no gross undesired evaporative emissions stemming from the fuel system and evaporative emissions system.

Proceeding to 1018, the CPV may be closed to isolate the fuel system and evaporative emissions system from atmosphere and from engine intake, and monitoring a pressure bleed-up in the fuel system and evaporative emissions system. Again, pressure may be monitored by a pressure sensor (e.g., 107). Pressure may be monitored for a predetermined duration, in some examples. If pressure in the fuel system and evaporative emissions system reaches a predetermined threshold pressure, or if a rate of pressure bleed-up exceeds a predetermined pressure bleed-up rate, then non-gross undesired evaporative emissions may be indicated. However, if, during the predetermined duration, pressure does not reach the predetermined threshold pressure, or if the rate of pressure bleed-up does not exceed the predetermined pressure bleed-up rate, then it may be indicated that non-gross undesired evaporative emissions are not present. As such, step 1018 comprises testing for the presence or absence of non-gross undesired evaporative emissions by comparing a pressure change in the fuel system or evaporative emission system to a reference pressure change after evacuating the fuel system and evaporative emissions system.

Proceeding to step 1020, the results of the evaporative emissions test diagnostic procedure may be stored at the controller. Continuing to 1022, method 1000 may include maintaining closed the CPV, and commanding ELCM COV (e.g. 315) to the first position. By maintaining closed the CPV, the fuel system and evaporative emissions system may be sealed from engine intake (and from the ejector). Furthermore, by commanding the ELCM COV to the first position, pressure in the fuel system and evaporative emissions system may return to atmospheric pressure. In an example where the FTIV was open to conduct the test for undesired evaporative emissions, the FTIV may be maintained open until it is indicated that the evaporative emissions system and fuel system is at atmospheric pressure, and may then be commanded (e.g. actuated) closed. Method 600 may then end.

Returning to 1012, if it is indicated that vacuum build in the fuel system and evaporative emissions system did not reach the predetermined threshold vacuum, method 1000 may proceed to 1014. At 1014, method 1000 may include indicating that either CV1 is stuck closed, or that gross undesired evaporative emissions are present in the fuel system and evaporative emissions system. In other words, the vacuum build may have been prevented from reaching the predetermined vacuum threshold due to the CV1 being stuck closed, or due to gross undesired evaporative emissions. Accordingly, a conclusive determination as to the source of the failure to reach the predetermined threshold vacuum may not be indicated at 1014. Instead, method 1000 may proceed to 1020. At 1020, method 1000 may include storing the results of the evaporative emissions test diagnostic at the controller. The method may then proceed to 1022 and then end.

Turning now to FIG. 11, an example timeline 1100 is shown for determining whether a first check valve (CV1) (e.g. 153 in FIG. 1) is stuck open or closed, whether a second check valve (CV2) (e.g. 170 in FIG. 1) is stuck closed, and whether undesired evaporative emissions are present in a vehicle fuel system and evaporative emissions system. Timeline 100 includes plot 1105, indicating whether conditions are met for conducting an evaporative emissions test under boosted engine operation, and plot 1110, indicating whether conditions are met for conducting an evaporative emissions test under natural aspiration conditions (e.g. engine intake manifold vacuum), over time. Timeline 1100 further includes plot 1115, indicating manifold air pressure in relation to barometric pressure (BP), over time. Such an indication may be made by a pressure sensor (e.g. 117) positioned in the intake manifold. Timeline 1100 further includes plot 1120, indicating whether a canister purge valve (CPV) (e.g. 158) is open or closed, plot 1123, indicating whether a fuel tank isolation valve (FTIV) (e.g. 191) is open or closed, and plot 1125, indicating a position of an ELCM changeover valve (COV) (e.g. 315), over time. ELCM COV may be in a first position, as discussed above with regard to FIG. 3A and FIG. 3C, or in a second position, as discussed above with regard to FIG. 3B and FIG. 3D.

Timeline 1100 further includes plot 1130, indicating pressure in a vehicle fuel system and evaporative emissions system, over time. Line 1131 represents a vacuum build threshold, which, if reached during an evaporative emissions test under boost or natural aspiration conditions, may indicate an absence of gross undesired evaporative emissions. Line 1132 represents a pressure bleedup threshold, which, if reached during a pressure bleedup phase of either an evaporative emissions test under boost or natural aspiration conditions, may indicate the presence of non-gross undesired evaporative emissions. Timeline 1100 further includes plot 1135, indicating whether the CV1 is stuck closed, and plot 1140, indicating whether the CV1 is stuck open, over time. Timeline 1100 further includes plot 1145, indicating whether the CV2 is stuck closed, over time. Timeline 1100 further includes plot 1150, indicating whether undesired evaporative emissions are indicated in the fuel system and evaporative emissions system, over time.

As discussed previously, in some examples, only the evaporative emissions system may be diagnosed as to the presence or absence of undesired evaporative emissions, by keeping the FTIV closed during the tests under natural aspiration conditions (FIG. 10) and boosted engine operation (e.g. FIG. 9). However, in this example timeline 1100, both the fuel system and evaporative emissions system are indicated to be diagnosed, as will be discussed below.

At time t0, while not explicitly illustrated, it may be understood that the vehicle is in operation, and that the vehicle is operating via the engine combusting fuel to propel the vehicle. Conditions for conducting an evaporative emissions test under either boost or natural aspiration conditions are not indicated to be met, as the manifold air pressure is indicated to be near barometric pressure. The CPV is closed, and the ELCM COV is in the first position. The FTIV is closed, however fuel tank pressure is near atmospheric pressure. The CV1 is not indicated to be either stuck open or closed, and the CV2 is not indicated to be stuck closed. Furthermore, undesired evaporative emissions in the fuel system and evaporative emissions system are not indicated.

Between time t0 and t1, manifold air pressure (MAP) decreases below barometric pressure. At time t1, conditions are indicated to be met for conducting an evaporative emissions test under natural aspiration conditions. As discussed above, conditions being met for an evaporative emissions test under natural aspiration may include an indication of manifold air pressure (MAP) less than barometric pressure (BP) by a predetermined threshold amount, an indication that an evaporative emissions test under natural aspiration conditions has not already been conducted during the current drive cycle, an indication that a purge event is not in progress, no prior indication of undesired evaporative emissions in the fuel system and evaporative emissions system, and no prior indication of CV1 being stuck closed.

With conditions for conducting an evaporative emissions test under natural aspiration conditions being met at time t1, the ELCM COV is commanded to the second position, the FTIV is commanded open, and the CPV is commanded open. More specifically, commanding open the FTIV may fluidically couple the fuel system to the evaporative emissions system. Furthermore, commanding the ELCM COV to the second position may seal the fuel system and evaporative emissions system from atmosphere. Still further, opening the CPV may communicate engine manifold vacuum to the sealed fuel system and evaporative emissions system.

Between time t1 and t2, pressure in the fuel system and evaporative emissions system as monitored by the FTPT (e.g. 107) becomes negative with respect to BP. At time t2, pressure in the fuel system and evaporative emissions system reaches the vacuum build threshold. As the vacuum build threshold was reached, gross undesired evaporative emissions are not indicated. Furthermore, as the vacuum build threshold was indicated to be reached, the CV1 is not indicated to be stuck closed. However, it may be possible that the CV1 is in a stuck open configuration. Whether the CV1 is stuck open may be indicated by conducting an evaporative emissions test under boost conditions, as discussed above, and which will be discussed in further detail below.

With the vacuum build threshold reached at time t2, the CPV is commanded closed, thus sealing the fuel system and evaporative emissions system from engine intake. Between time t2 and t3, pressure bleedup in the fuel system and evaporative emissions system is monitored. In some examples, pressure may be monitored for a predetermined duration, which in this example timeline 1100 may comprise the duration between time t2 and t3.

Between time t2 and t3, pressure in the fuel system and evaporative emissions system rises, but remains below the pressure bleedup threshold, represented by line 1132. Accordingly, non-gross undesired evaporative emissions are not indicated. With the test completed, conditions are no longer indicated to be met for conducting the test for undesired evaporative emissions under natural aspiration conditions. Accordingly, the ELCM COV is commanded to the first position, to couple the fuel system and evaporative emissions system to atmosphere. With the fuel system and evaporative emissions system coupled to atmosphere, pressure in the fuel system and evaporative emissions system returns to atmospheric pressure between time t3 and t4. Responsive to pressure in the fuel system and evaporative emissions system reaching atmospheric pressure, the FTIV is commanded closed at time t4 to seal the fuel system from the evaporative emissions system.

Between time t4 and t5, manifold air pressure rises and becomes positive with respect to BP. Thus, at time t5, conditions are indicated to be met for conducting an evaporative emissions test under boosted engine operation. As discussed above, conditions being met for conducting an evaporative emissions test under boosted engine operation includes an indication of manifold air pressure (MAP) greater than BP by a predetermined threshold, an indication that an evaporative emissions test under boost conditions has not already been conducted during the current drive cycle, an indication that a purge event is not in progress, no prior indication of undesired evaporative emissions in the fuel system and/or evaporative emissions system, and no prior indication of CV2 (e.g. 170) being stuck closed.

With conditions for conducting the evaporative emissions test under boosted engine operation being indicated to be met at time t5, the ELCM COV is commanded to the second position, the FTIV is commanded to the open position, and the CPV is commanded to the open position. As discussed above, opening the FTIV may fluidically couple the fuel system and evaporative emissions system, and configuring the ELCM COV to the second position may seal the fuel system and evaporative emissions system from atmosphere. Furthermore, by commanding open the CPV, vacuum derived from the ejector system under boosted engine operation may be communicated to the fuel system and evaporative emissions system.

Between time t5 and t6, pressure in the fuel system and evaporative emissions system drops with respect to BP, and at time t6, the vacuum build threshold is indicated to have been reached. Accordingly, no gross undesired evaporative emissions are indicated. Furthermore, because the vacuum build threshold was reached at time t6, it may be further indicated that the CV2 is not stuck closed. If the CV2 were stuck closed, the vacuum build threshold would not be expected to be reached. Still further, because the vacuum build threshold was indicated to be reached, and positive pressure was not indicated, it may be indicated that the CV1 is not in a stuck open configuration. If the CV1 was stuck open, a positive pressure build with respect to atmospheric pressure would have been indicated in the fuel system and evaporative emissions system.

With the vacuum build threshold reached at time t6, the CPV is commanded closed to seal the fuel system and evaporative emissions system from engine intake. Between time t6 and t7, pressure in the fuel system and evaporative emissions system is monitored. As discussed above, pressure in the fuel system and evaporative emissions system may be monitored for a predetermined duration, which in this example timeline corresponds to the duration between time t6 and t7. Between time t6 and t7, pressure in the fuel system and evaporative emissions system remains below the pressure bleedup threshold, and accordingly, non-gross undesired evaporative emissions are not indicated.

As the test is complete at time t7, conditions for conducting the evaporative emissions test under boosted engine operation are no longer indicated to be met. Thus, at time t7, the ELCM COV is commanded to the first position. As discussed above, with the ELCM COV commanded to the first position, the fuel system and evaporative emissions system may be coupled to atmosphere, to relieve pressure in the fuel system and evaporative emissions system. Accordingly, between time t7 and t8, pressure in the fuel system and evaporative emissions system returns to atmospheric pressure. With pressure in the fuel system and evaporative emissions system at atmospheric pressure, the FTIV is commanded closed at time t8, thus sealing the fuel system from the evaporative emissions system. Between time t8 and t9, the vehicle remains in operation.

In this way, at an initiation of a drive cycle, a previously characterized road segment of the drive cycle may be identified, one or more windows for carrying out a diagnostic routine of an engine sub-system may be predicted during travel of the vehicle on the identified road segment based on statistical parameters of the identified road segment estimated during previous travels of the vehicle on the road segment, the diagnostic routine may be carried out one or more times during the predicted one or more windows based on a completion rate of the diagnostic routine, and upon completion of travel on the identified road segment, the statistical parameters of the identified road segment may be updated. The technical effect of learning statistical parameters for a frequently traveled road segment and using the statistical parameters to preview future travels on the road segment is that diagnostic routines may be optimally scheduled to improve completion rate of the routine. Overall, by improving completion arte for on-board diagnostics, engine robustness may be monitored and compliance with regulations may be maintained.

An example method for an engine of a vehicle, comprises: during travel of the vehicle on a road segment of a drive cycle, scheduling a diagnostic routine for an engine sub-system based on statistical parameters for the drive cycle as learned during one or more previous travels of the vehicle on the road segment, and a variable adjustable based on a completion rate of the diagnostic routine. In the preceding example, additionally or optionally, the statistical parameters include a first number of boosted events during which the engine is operated under boosted conditions, a second number of naturally aspirated events during which the engine is operated under naturally aspirated conditions, a first mean of durations of the boosted events, a second mean of durations of the naturally aspirated events, a first variance of the durations of the boosted events, and a second variance of the durations of the naturally aspirated events. In any or all of the preceding examples, the method further comprising, additionally or optionally, during the one or more previous travels of the vehicle on the road segment, identifying the road segment, learning the first number of boosted events, the second number of naturally aspirated events, the first mean, the second mean, the first variance, and the second variance, and upon completion of travel on the road segment during each of the one or more previous travels, updating each of the first number of boosted events, the second number of naturally aspirated events, the first mean, the second mean, the first variance, and the second variance based on the learning. In any or all of the preceding examples, additionally or optionally, scheduling the diagnostic routine based on statistical parameters includes, predicting one or more boosted events during travel on the road segment based on the first number of boosted events, the updated first mean, the updated first variance, and the variable, and scheduling the diagnostic routine during the one or more predicting boosted events. In any or all of the preceding examples, additionally or optionally, scheduling the diagnostic routine based on statistical parameters further includes predicting one or more naturally aspirated events during travel on the road segment based on the second number of naturally aspirated events, the updated second mean, the updated second variance, and the variable, and scheduling the diagnostic routine during the one or more predicting naturally aspirated events. In any or all of the preceding examples, additionally or optionally, the diagnostic routine includes detection of degradation of components of an evaporative emissions control system and a fuel vapor system including a fuel vapor storage container. In any or all of the preceding examples, additionally or optionally, the scheduling the diagnostic routine during the one or more predicting boosted events includes selecting one of the predicted one or more boosted events with a lower than threshold load in the vapor storage canister, and wherein scheduling the diagnostic routine during the one or more predicting naturally aspirated events includes selecting one of the predicted one or more naturally aspirated events with a lower than threshold load in the vapor storage canister. Any or all of the preceding examples, furtehr comprising, additionally or optionally, upon completion of the diagnostic routine, estimating the completion rate of the diagnostic routine as a ratio of a first number of times the diagnostic routine is completed and a number of drive cycles for the engine, and in response to the completion rate being lower than a threshold, repeating the diagnostic routine during the predicted one or more boosted events and/or the predicted one or more naturally aspirated events. In any or all of the preceding examples, the method further comprising, additionally or optionally, in response to the completion rate of the diagnostic routine upon completion of the drive cycle decreasing relative to the completion rate of the diagnostic routine during an immediately previous drive cycle, decreasing a value of the variable until the completion rate increases above the threshold and then maintaining the value of the variable for the subsequent drive cycles. In any or all of the preceding examples, the method further comprising, additionally or optionally, in response to the completion rate of the diagnostic routine decreasing below the threshold after decreasing the value of the variable, increasing the value of the variable, the value of the variable adjustable between −5 and +5.

Another example for an engine in a vehicle, comprises: at an initiation of a drive cycle, identifying a previously characterized road segment of the drive cycle, predicting one or more windows for carrying out a diagnostic routine of an engine sub-system during travel of the vehicle on the identified road segment based on statistical parameters of the identified road segment estimated during previous travels of the vehicle on the road segment, carrying out the diagnostic routine one or more times during the predicted one or more windows based on a completion rate of the diagnostic routine, and upon completion of travel on the identified road segment, updating the statistical parameters of the identified road segment. In the preceding example, additionally or optionally, the one or more windows include a first window where the engine is operated under boosted conditions and/or a second window where the engine is operated under naturally aspirated conditions. In any or all of the preceding examples, additionally or optionally, the statistical parameters include a first number of boosted events, a second number of naturally aspirated events, a first mean of durations of the boosted events, a second mean of durations of the naturally aspirated events, a first variance of the durations of the boosted events, and a second variance of the durations of the naturally aspirated events, the statistical parameters of the identified road segment updated upon each completion of travel on the road segment. In any or all of the preceding examples, additionally or optionally, the predicting of the one or more windows is based on the first number of boosted events, the second number of naturally aspirated events, the first mean of durations of the boosted events, the second mean of durations of the naturally aspirated events, the first variance of the durations of the boosted events, the second variance of the durations of the naturally aspirated events, and a incrementally adjustable variable. In any or all of the preceding examples, the method further comprising, additionally or optionally, in response to the completion rate being lower than a first threshold, decreasing a value of the incrementally adjustable variable until the completion rate increase to above the first threshold, and then in response to a decrease in completion rate, increasing the value of the incrementally adjustable variable. In any or all of the preceding examples, additionally or optionally, carrying out the diagnostic routine one or more times during the predicted one or more windows based on the completion rate of the diagnostic routine includes: in response to the completion rate of the diagnostic routine being higher than a second threshold, carrying out the diagnostic routine once during the drive cycle, and in response to the diagnostic routine being lower than the second threshold, carrying out the diagnostic routine two or more times during the drive cycle, the second threshold higher than the first threshold. In any or all of the preceding examples, additionally or optionally, the diagnostic routine includes detection of degradation of an evaporative emissions control system and a fuel vapor system carried out during engine operation under boosted conditions or engine operation under naturally aspirated conditions.

Yet another example system for a vehicle, comprises: an engine operable under boosted and natural aspiration conditions, and a controller storing instructions in non-transitory memory that, when executed, cause the controller to: during travel on an identified road segment previously characterized during one or more prior travels of the vehicle along the road segment, preview boosted engine operation and naturally aspirated engine operation during travel on the identified road segment based on statistical parameters of an identified road segment previously characterized during the one or more prior travels of the vehicle along the road segment; and schedule a diagnostic routine for a fuel system including a fuel tank selectively coupled to an evaporative emissions system based on each of the previewed boosted engine operation and naturally aspirated engine operation, a state of loading of a fuel vapor storage canister positioned in the evaporative emissions system, and a variable adjustable based on a completion rate of the diagnostic routine. In the preceding example, additionally or optionally, the diagnostic routine is scheduled during a boost event or a naturally aspirated event when the state of state of loading of the fuel vapor storage canister is lower than a threshold load and an absence of fuel sloshing is previewed. In any or all of the preceding examples, additionally or optionally, the diagnostic routine includes: coupling the fuel system to the evaporative emissions system by commanding open a fuel tank isolation valve, sealing the fuel system and evaporative emissions system from atmosphere by commanding a changeover valve of an onboard pump positioned in a vent line between the fuel vapor storage canister and atmosphere to a second position, commanding closed a canister purge valve positioned in a purge line downstream of the fuel vapor storage canister, monitoring pressure in the fuel system and evaporative emissions system, and indicating the fuel system and evaporative emissions system are free from undesired evaporative emissions responsive to pressure in the fuel system and evaporative emissions system remaining below a predetermined threshold pressure for a predetermined duration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
via a controller of the engine,
during travel of the vehicle on a road segment of a drive cycle, scheduling a time fora diagnostic routine for an engine sub-system based on statistical parameters for the drive cycle as learned during one or more previous travels of the vehicle on the road segment, and a variable, the variable adjustable based on a completion rate associated with the diagnostic routine; and
initiating the diagnostic routine at the time scheduled, where initiating the diagnostic routine includes:
commanding actuation of an evaporative level check module (ELCM) valve of the engine sub-system; then
monitoring a pressure of the engine sub-system via a pressure sensor of the engine sub-system for a predetermined time period; and
outputting results of the diagnostic routine based on the pressure measured during the predetermined time period.

2. The method of claim 1, wherein the statistical parameters include a first number of boosted events during which the engine is operated under boosted conditions, a second number of naturally aspirated events during which the engine is operated under naturally aspirated conditions, a first mean of durations of the boosted events, a second mean of durations of the naturally aspirated events, a first variance of the durations of the boosted events, and a second variance of the durations of the naturally aspirated events.

3. The method of claim 1, further comprising, during the one or more previous travels of the vehicle on the road segment, identifying the road segment, learning a first number of boosted events, a second number of naturally aspirated events, a first mean, a second mean, a first variance, and a second variance, and upon completion of travel on the road segment during each of the one or more previous travels, updating each of the first number of boosted events, the second number of naturally aspirated events, the first mean, the second mean, the first variance, and the second variance based on the learning.

4. The method of claim 3, wherein scheduling the diagnostic routine based on statistical parameters includes, predicting one or more boosted events during travel on the road segment based on the first number of boosted events, the updated first mean, the updated first variance, and the variable, and scheduling the diagnostic routine during the one or more predicted boosted events.

5. The method of claim 4, wherein scheduling the diagnostic routine based on statistical parameters further includes predicting one or more naturally aspirated e vents during travel on the road segment based on the second number of naturally aspirated events, the updated second mean, the updated second variance, and the variable, and scheduling the diagnostic routine during the one or more predicted naturally aspirated events.

6. The method of claim 5, wherein the diagnostic routine includes detection of degradation of components of an evaporative emissions control system and a fuel vapor system including a fuel vapor storage container.

7. The method of claim 6, wherein the scheduling the diagnostic routine during the one or more predicted boosted events includes selecting one of the predicted one or more boosted events with a lower than threshold load in the fuel vapor storage canister, and wherein scheduling the diagnostic routine during the one or more predicted naturally aspirated events includes selecting one of the predicted one or more naturally aspirated events with a lower than threshold load in the fuel vapor storage canister.

8. The method of claim 5, further comprising, upon completion of the diagnostic routine, estimating the completion rate associated with the diagnostic routine as a ratio of a first number of times the diagnostic routine is completed and a number of drive cycles for the engine, and in response to the completion rate being lower than a threshold, repeating the diagnostic routine during the predicted one or more boosted events and/or the predicted one or more naturally aspirated events.

9. The method of claim 8, further comprising, in response to the completion rate of the diagnostic routine upon completion of the drive cycle decreasing relative to the completion rate of the diagnostic routine during an immediately previous drive cycle, decreasing a value of the variable until the completion rate increases above the threshold and then maintaining the value of the variable for subsequent drive cycles.

10. The method of claim 9, further comprising, in response to the completion rate of the diagnostic routine decreasing below the threshold after decreasing the value of the variable, increasing the value of the variable, the value of the variable adjustable between −5 and +5.

11. A method for an engine in a vehicle, comprising:
via a controller of the engine,
at an initiation of a drive cycle,
identifying a previously characterized road segment of the drive cycle;
predicting one or more windows for carrying out a diagnostic routine of an engine sub-system during travel of the vehicle on the identified road segment based on statistical parameters of the identified road segment estimated during previous travels of the vehicle on the identified road segment;
carrying out the diagnostic routine one or more times during the predicted one or more windows based on a completion rate associated with the diagnostic routine, wherein carrying out the diagnostic routine comprises:
commanding actuation of an evaporative level check module (ELCM) valve of the engine sub-system; then
monitoring a pressure of the engine sub-system via a pressure sensor of the engine sub-system for a predetermined time period; and
outputting results of the diagnostic routine based on the pressure measured during the predetermined time period; and
upon completion of travel on the identified road segment, updating the statistical parameters of the identified road segment based on the results of the diagnostic routine.

12. The method of claim 11, wherein the one or more windows include a first window where the engine is operated under boosted conditions and/or a second window where the engine is operated under naturally aspirated conditions.

13. The method of claim 11, wherein the statistical parameters include a first number of boosted events, a second number of naturally aspirated events, a first mean of durations of the boosted events, a second mean of durations of the naturally aspirated events, a first variance of the durations of the boosted events, and a second variance of the durations of the naturally aspirated events, the statistical parameters of the identified road segment updated upon each completion of travel on the identified road segment.

14. The method of claim 13, wherein the predicting of the one or more windows is based on the first number of boosted events, the second number of naturally aspirated events, the first mean of the durations of the boosted events, the second mean of the durations of the naturally aspirated events, the first variance of the durations of the boosted events, the second variance of the durations of the naturally aspirated events, and an incrementally adjustable variable.

15. The method of claim 14, further comprising, in response to the completion rate being lower than a first threshold, decreasing a value of the incrementally adjustable variable until the completion rate increase to above the first threshold, and then in response to a decrease in completion rate, increasing the value of the incrementally adjustable variable.

16. The method of claim 13, wherein carrying out the diagnostic routine one or more times during the predicted one or more windows based on the completion rate of the diagnostic routine includes: in response to the completion rate of the diagnostic routine being higher than a second threshold, carrying out the diagnostic routine once during the drive cycle, and in response to the completion rate of the diagnostic routine being lower than the second threshold, carrying out the diagnostic routine two or more times during the drive cycle, the second threshold higher than the first threshold.

17. The method of claim 11, wherein the diagnostic routine includes detection of degradation of an evaporative emissions control system and a fuel vapor system carried out during engine operation under boosted conditions or engine operation under naturally aspirated conditions.

18. A system fora vehicle, comprising:
an engine operable under boosted and natural aspiration conditions, and a controller storing instructions in non-transitory memory that, when executed, cause the controller to:
during travel on an identified road segment previously characterized during one or more prior travels of the vehicle along the identified road segment,
preview boosted engine operation and naturally aspirated engine operation during travel on the identified road segment based on statistical parameters of an identified road segment previously characterized during the one or more prior travels of the vehicle along the identified road segment; and
schedule a time for a diagnostic routine for a fuel system including a fuel tank selectively coupled to an evaporative emissions system based on each of the previewed boosted engine operation and naturally aspirated engine operation, a state of loading of a fuel vapor storage canister positioned in the evaporative emissions system, and a variable adjustable based on a completion rate associated with the diagnostic routine; and initiate the diagnostic routine at the time scheduled, where initiating the diagnostic routine includes:

commanding actuation of an evaporative level check module (ELCM) valve of the evaporative emissions system; then monitoring a pressure of the evaporative emissions system via a pressure sensor of the evaporative emissions system for a predetermined time period; and outputting results of the diagnostic routine based on the pressure measured during the predetermined time period.

19. The system of claim 18, wherein the diagnostic routine is scheduled during a boost event or a naturally aspirated event when the state of loading of the fuel vapor storage canister is lower than a threshold load and an absence of fuel sloshing is previewed, wherein the state of loading is a loading of vaporized hydrocarbons.

20. The system of claim 18, wherein the diagnostic routine includes:

coupling the fuel system to the evaporative emissions system by commanding open a fuel tank isolation valve;

sealing the fuel system and evaporative emissions system from atmosphere by commanding a changeover valve of an onboard pump positioned in a vent line between the fuel vapor storage canister and atmosphere to a second position;

commanding closed a canister purge valve positioned in a purge line downstream of the fuel vapor storage canister;

monitoring pressure in the fuel system and evaporative emissions system; and indicating the fuel system and evaporative emissions system are free from undesired evaporative emissions responsive to pressure in the fuel system and evaporative emissions system remaining below a predetermined threshold pressure for a predetermined duration.

* * * * *